United States Patent
Darcie et al.

(10) Patent No.: US 6,493,335 B1
(45) Date of Patent: Dec. 10, 2002

(54) METHOD AND SYSTEM FOR PROVIDING LOW-COST HIGH-SPEED DATA SERVICES

(75) Inventors: Thomas Edward Darcie, Middletown; Bhavesh Desai, Livingston; Alan H. Gnauck, Middletown; Xiaolin Lu, Matawan; Sheryl Leigh Woodward, Holmdel, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/718,853

(22) Filed: Sep. 24, 1996

(51) Int. Cl.$^7$ .............................. H04B 7/208; H04J 3/12
(52) U.S. Cl. .................. 370/344; 370/348; 370/432; 370/448; 370/485; 370/528; 725/127
(58) Field of Search ................. 370/229–231, 370/235–237, 248, 249, 438, 439, 445–448, 463, 480, 485, 496, 522, 524, 528, 486, 279, 285, 293, 312, 315, 327, 343, 344, 348, 432, 401; 725/127

(56) References Cited

U.S. PATENT DOCUMENTS

| | | | | |
|---|---|---|---|---|
| 4,701,909 A | * | 10/1987 | Kavehrad et al. ........... | 370/446 |
| 4,782,484 A | * | 11/1988 | Limb .......................... | 370/445 |
| 4,901,277 A | | 2/1990 | Soloway et al. ............. | 300/233 |
| 5,079,766 A | * | 1/1992 | Richard et al. ............. | 370/445 |
| 5,412,376 A | | 5/1995 | Chujo et al. ................ | 370/397 |
| 5,504,738 A | * | 4/1996 | Sambamurthy et al. ..... | 370/445 |
| 5,515,359 A | | 5/1996 | Zheng ......................... | 370/232 |
| 5,553,071 A | * | 9/1996 | Aranguren et al. .......... | 370/445 |
| 5,586,121 A | * | 12/1996 | Moura et al. ................ | 370/404 |
| 5,608,729 A | * | 3/1997 | Orsic .......................... | 370/445 |
| 5,648,956 A | * | 7/1997 | Sambamurthy et al. ..... | 370/296 |
| 5,719,872 A | * | 2/1998 | Dubberly et al. ........... | 370/487 |
| 5,734,643 A | * | 3/1998 | Rondeau ..................... | 370/279 |
| 5,771,235 A | * | 6/1998 | Tang et al. .................. | 370/446 |
| 5,864,415 A | * | 1/1999 | Williams et al. ............ | 370/907 |
| 5,864,672 A | * | 1/1999 | Bodeep et al. .................. | 348/6 |
| 5,959,660 A | * | 9/1999 | Levan ......................... | 370/485 |
| 5,963,557 A | * | 10/1999 | Eng ............................. | 370/432 |
| 6,002,669 A | * | 12/1999 | White ......................... | 370/235 |

FOREIGN PATENT DOCUMENTS

JP 7154420 A2 6/1995

* cited by examiner

Primary Examiner—Seema S. Rao
(74) Attorney, Agent, or Firm—Oliff & Berridge, PLC

(57) ABSTRACT

A communication network uses intermediate nodes to resolve local traffic contention. Intermediate nodes receive upstream signals from end users, derive traffic information signals from the upstream signals, and transmit the traffic information signals to end users. By listening to the traffic information signals from the intermediate node, the end users know whether the upstream transmission channels are idle or busy, or whether a collision has occurred. The intermediate nodes derive and transmit the traffic information signals with or without the assistance of the central office or head end.

67 Claims, 18 Drawing Sheets

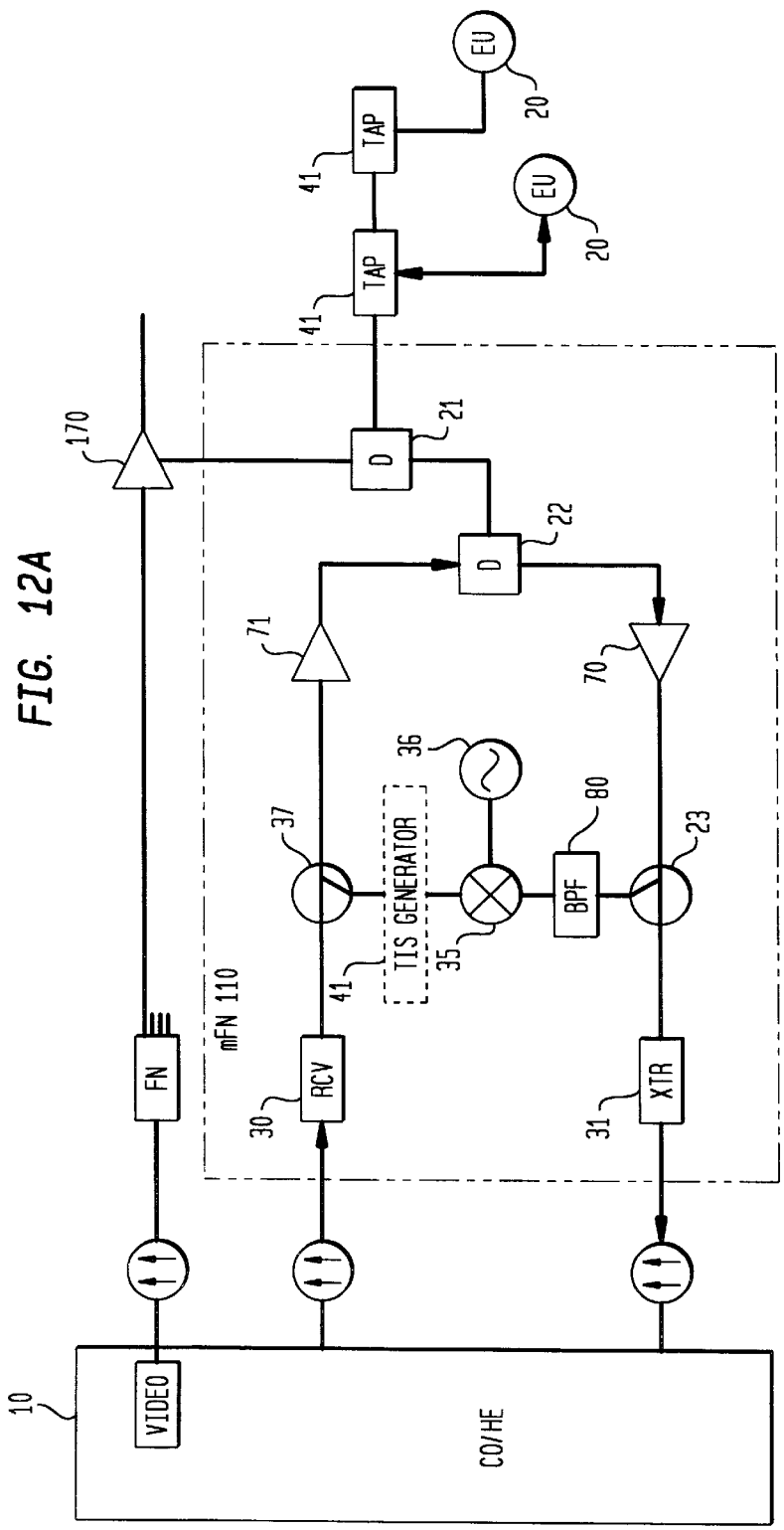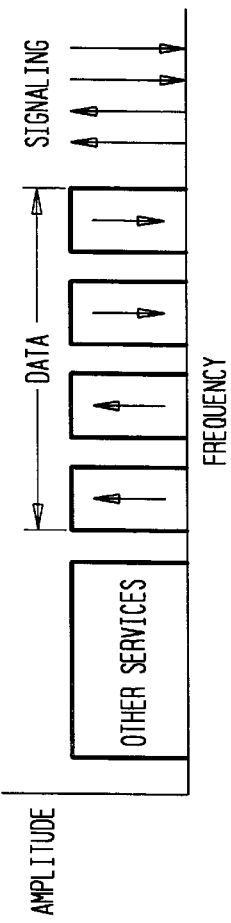
FIG. 12A
FIG. 12B

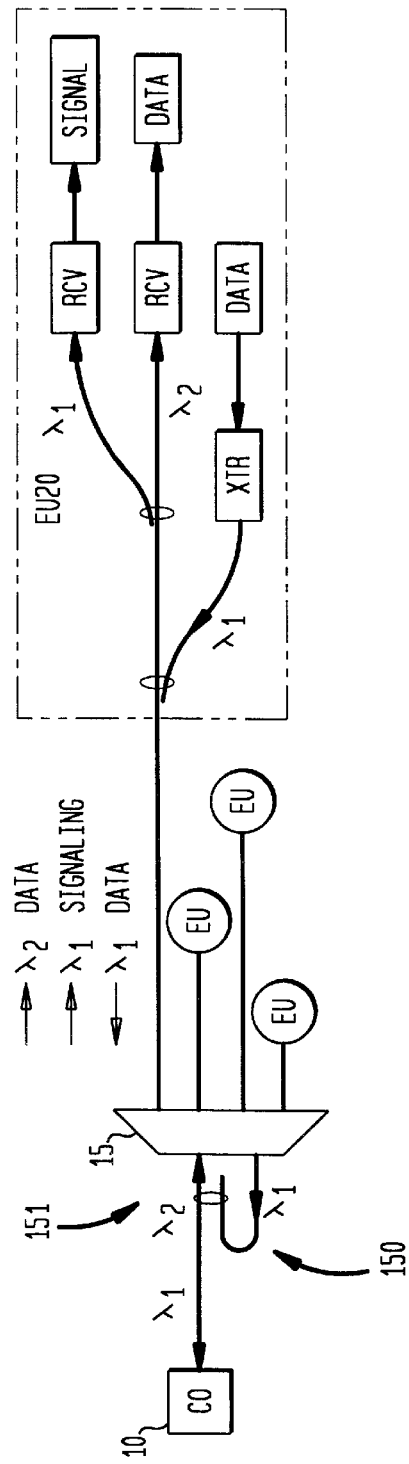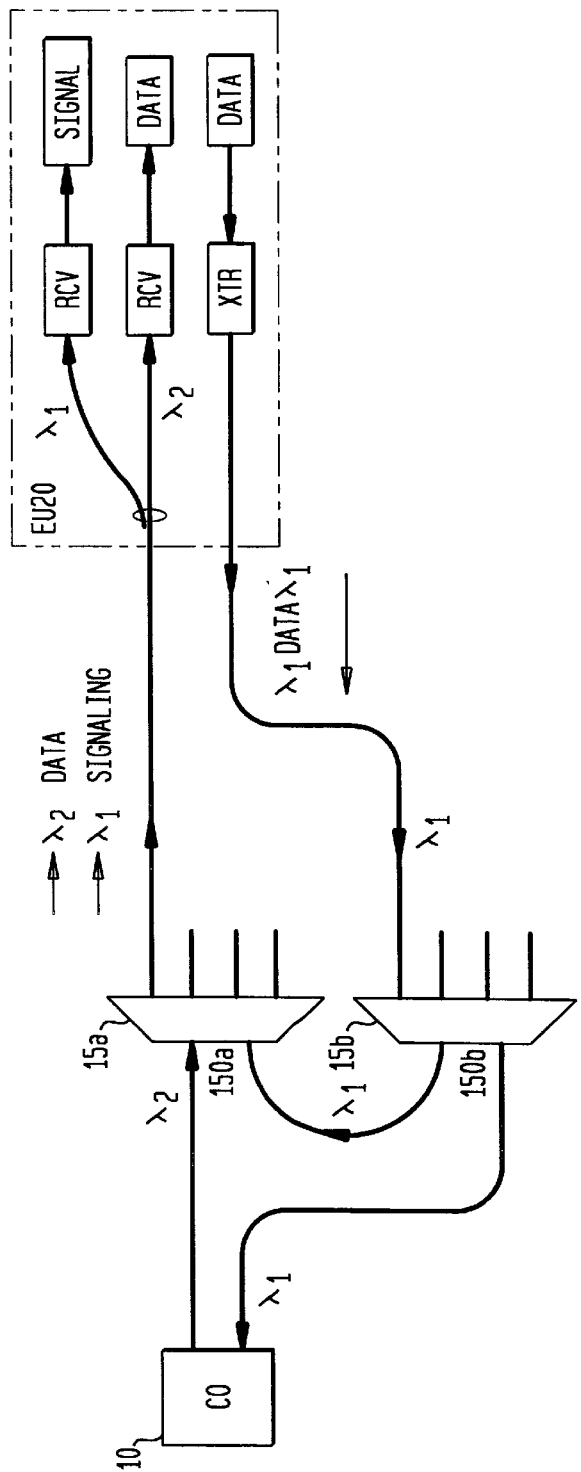
FIG. 14A
FIG. 14B

METHOD AND SYSTEM FOR PROVIDING LOW-COST HIGH-SPEED DATA SERVICES

FIELD OF THE INVENTION

The invention relates to providing bi-directional broadband data services over resource-sharing networks using distributed local access control.

BACKGROUND OF INVENTION

Communication networks can be divided into two major categories: (a) central-control and (b) peer-to-peer. The central-control networks deploy a central office (CO) to control all the transmissions to and from end users (EUs). In peer-to-peer networks, the EUs control their own transmission in coordination with other EUs with or without the help of the CO.

a. Central Control Systems

Central control systems could be either point-to-multipoint systems, such as passive optical networks (PONS) and hybrid fiber/coax (HFC) networks, or point-to-point systems, such as active star networks (ASN) used in current local telephone systems.

In point-to-multipoint systems, multiple users share the same physical transmission media. For downstream transmission, information is broadcast to all or groups of users over the downstream channel(s) and each EU selects the information addressed to this particular user. For upstream transmission, Time Division Multiple Access (TDMA) is one of the methods often used to avoid collision over the shared transmission path. Using TDMA, in which multiple EUs share the same frequency or wavelength channel, certain media access control (MAC) has to be deployed at both CO and EUs to coordinate the traffic and let the EUs access the same channel in turn.

Reservation-like or reservation-contention combined MAC protocol is usually used, in which the CO either preschedules all the EUs' upstream transmission or dynamically assigns the upstream channel (time slot) for each EU based on its request.

Several difficulties or complexities arise with these point-to-multipoint systems using the aforementioned protocol. Because the distance from the CO to each EU is different, the MAC protocol has to be able to resolve problems arising as a result of the different distances. Delay and overhead in transmission are therefore unavoidable. Further, in systems like conventional HFC, the limited upstream bandwidth and noise also make it necessary to use certain modulation schemes such as quadranture phase shift keying (QPSK) or quadranture amplitude modulation (QAM) techniques, because they are bandwidth efficient and robust to noise. However, these systems are also complicated and expensive.

In point-to-point systems, the CO has dedicated physical lines to each EU. Therefore, no MAC is needed. However, the implementation and maintenance could be very expensive. Some systems deploy remote nodes which perform the concentration or multiplexing function to achieve equipment sharing, thus reducing the cost (Active Double Star: ADS; Fiber-to-the-curb: FTTC). Nevertheless, the remote nodes could become a potential bandwidth bottleneck for future capacity requirement.

b. Peer-to-peer Systems

Peer-to-peer systems are very popular in computer networks, especially in Local Area Networks (LANs). In these systems, each EU controls its own transmission in coordination with other EUs with or without the assistance of the CO. The MAC algorithm could be contention or reservation-based Aloha, Carrier-Sense Multiple Access with Collision Detection (CSMA/CD), or token pass, which are all protocols well known in the art. The most widely used LAN is the Ethernet using CSMA/CD protocol.

Based on the CSMA/CD protocol, each EU listens to the traffic before transmitting (carrier-sense), transmits as soon as channel is idle, stops as soon as collision is detected (collision detection), and retransmits after back-off (the user defers transmission for a certain time period based on certain algorithms). The network is therefore self-controlled or self managed.

Because all the users share the same logical path for bidirectional transmission which is broadcast to the entire network, when one user is talking all the other users have to listen. Therefore, only half-duplex transmission can be achieved. This method is suitable for local area communication under low-load conditions, and allows only a small amount of traffic from the outside world to be efficiently transmitted into the LAN. It also requires that each EU detect collisions before finishing sending the packet. Therefore, the round trip delay over the entire network needs to be shorter than the time necessary to transmit an Ethernet packet having minimum packet size (512 bits or 51.2 $\mu$s at 10 Mbps). This limits the transmission distance to only a few kilometers. In addition, the broadcasting scheme also gives EUs no privacy because they are required to listen to other EUs' transmission.

Compared to the reservation-based MAC protocol used in central control networks, the contention-based CSMA/CD has the advantages of simplicity, low delay and less overhead at light traffic load, and no CO is necessary to coordinate the traffic. However, its local-broadcasting nature with limited transmission range and half-duplex operation makes it unsuitable for applications beyond LANs.

On the other hand, the directional topology of a central-control network such as a passive optical network (PON) or Hybrid fiber coax (HFC) network, prevents each EU from listening to its neighbor's upstream transmission or monitoring the traffic over the bus or trunk. Therefore, it is difficult to directly implement CSMA/CD over a central-control network unless the CO echoes at least part of the upstream traffic downstream to enable the EUs to monitor the upstream traffic, such as in 10Broad36 Ethernet (See IEEE 802.3). In typical networks with miles of coverage, the large round trip delay is beyond the limitations of the commonly used IEEE 802.3 (Ethernet) standard. Even with certain protocol modifications, this delay will significantly reduce the transmission efficiency.

SUMMARY OF THE INVENTION

The invention overcomes the difficulties and limitations associated with Ethernet-like LANs and complexities in reservation based MAC protocols often used in central control systems.

Intermediate nodes (INs) are provided to coordinate local signaling and provide traffic information to each EU without involving the CO. The INs derive traffic information signals from upstream signaling and send the traffic information signals (TIS) downstream to each EU. The INs either generate the TIS or loop back at least a part of the signals or signaling from the EUs. The standard CSMA scheme with Collision Detection or Collision Avoidance (CA) can then be deployed with the help of those INs regardless of whether the original network topology is central-control or peer-topeer, and independent of CO-EU distance. The intermediate nodes can implement several alternative methods of traffic regulation.

By separating two-way transmission over different communication paths or channels, and enabling two-way operation schemes in the user terminals (i.e. Ethernet cards inside computers), full-duplex transmission can also be achieved with high efficiency and dynamic traffic control. From an operations point of view, the boundary between central control and peer-to-peer control therefore disappears, and customers can use standard Ethernet cards to access the network.

BRIEF DESCRIPTION OF DRAWINGS

The invention will be described in detail with reference to the following drawings in which like reference numerals refer to like elements and wherein:

FIG. 12(a) illustrates an embodiment of the system using a mini-fiber node (mFN) as the intermediate node and FIG. 12(b) illustrates data transmission and services in relation to frequency;

FIG. 14(a) illustrates an embodiment of the system using one splitter within a PON network and FIG. 14(b) illustrates an embodiment using two splitters.

DETAILED DESCRIPTION OF PREFERRED EMBODIMENTS

Preferred embodiments of the invention are described hereafter with reference to the drawings.

1. Basic Network Architecture

Figure 1:
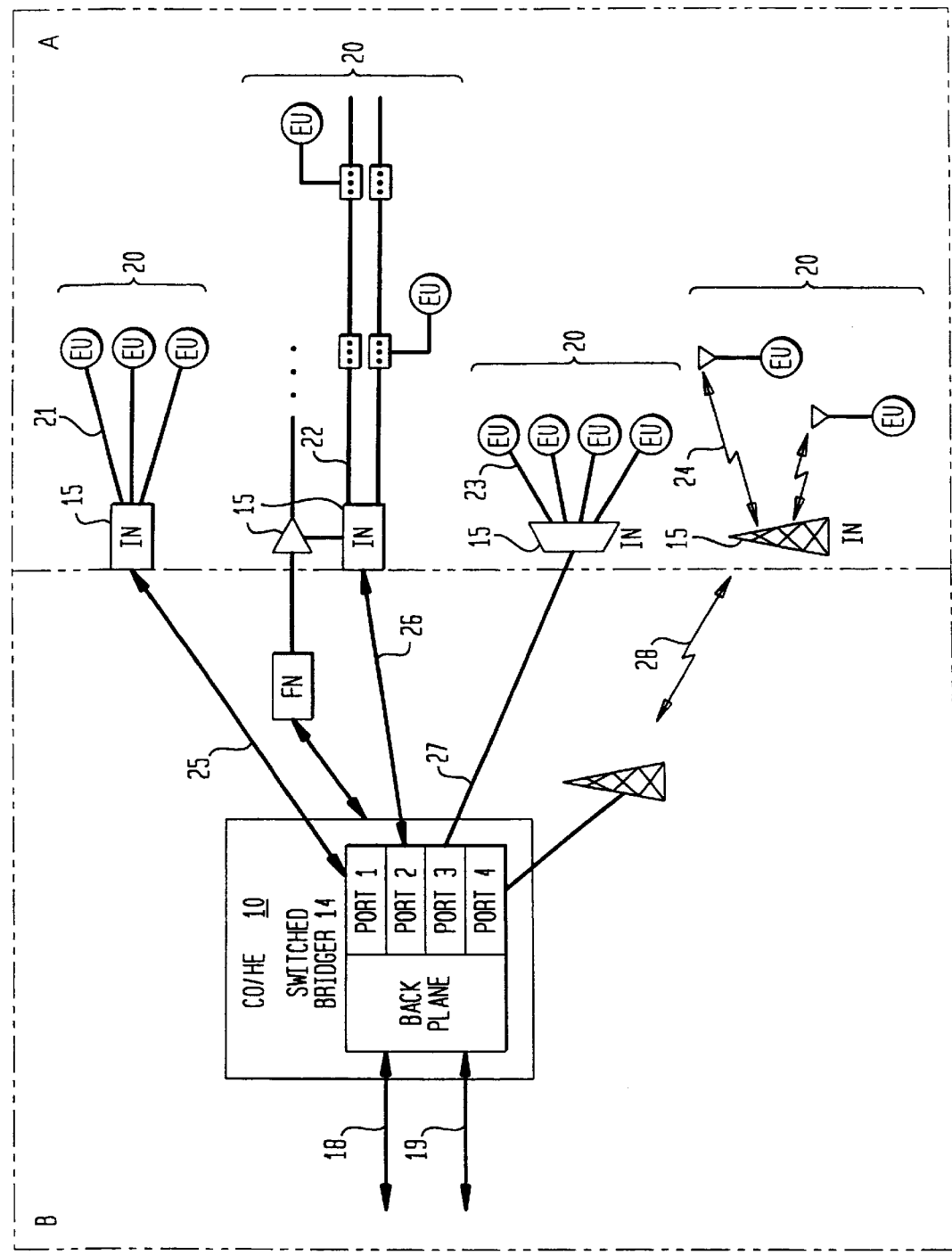
FIG. 1 is a block diagram illustrating some basic network architectures.

An embodiment of the basic network architecture is shown in FIG. 1. The Central Office (CO) or headend (HE) 10 connects to multiple remote intermediate nodes (INs) 15. INs 15 further establish connections to end users (EUs) 20 with a distribution network using either bus or star architecture. INs 15 could be either additional nodes added to the existing network or existing remote nodes with additional functions as discussed below.

To be compatible with IEEE802.3 standard (Ethernet), the distance between an IN and the furthest EU served by the IN is arranged such that the round trip delay is less than $51.2\,\mu s$, which corresponds to the time required for transmission of an Ethernet packet with minimum packet size. (Minimum packet size is 512 bits and standard transmission speed is 10 Mbps). If using an alternative packet size or alternative contention schemes, the distance could change accordingly.

The physical media between CO/HE and INs, or INs and EUs, could be fiber 23 as in a PON, coax cable 22 as in an HFC network, twisted pairs 21 as in an ASN, or radio link 24 as in a wireless network. An example of an applicable network is the Mini-Fiber Node Hybrid Fiber/Coax (mFN-HFC) network disclosed in U.S. Pat. No. 5,528,582 and in U.S. patent application Ser. No. 08/526,736, both incorporated herein by reference. In the mFN-HFC network, the cable TV headend is equivalent to the CO/HE, the mFNs are equivalent to the INs, and the distribution network between INs (mFNs) and EUs includes multiple passive-coax distribution legs (see for example FIG. 12(a) of the present application).

As shown in FIG. 1, the network can be divided into two major segments A and B. The distribution part A covers the INs 15, EUs 20 and the transmission media 21–24 between INs 15 and EUs 20. The INs 15 distribute downstream signals received from the CO/HE 10 to multiple EUs 20. The INs 15 also gather upstream signals from EUs 20 over the distribution networks using MAC protocol that will be discussed below, and forward them to the CO/HE 10.

Another segment B contains the CO/HE packet switching equipment 14, such as a regular Ethernet switched bridger or intelligent hubs and high-speed trunk lines 18 and 19. The packet switching equipment 14 may have one or more trunk ports 18, 19 that connect to high-speed trunks, and multiple distribution ports 1–4 that interface with INs 15 through distribution lines 25–28. In conventional Ethernet, one distribution port connects to one PC over RJ45 twisted pair (TP). Packet switching equipment 14 is capable of demultiplexing high-speed packets received over the trunk and routing them to each distribution port 1–4 based on the destination address (MAC layer) inside each packet. It also receives upstream packets from each distribution port, and routes the packets to another distribution port, if the packets are for the EU associated with that port. Otherwise packet switching equipment 14 multiplexes packets and sends them to other places over the high speed trunk. All these functions are available on commercial Ethernet switched bridgers. The packet switching equipment 14 may contain buffers, allowing it to receive incoming packets from multiple distribution ports simultaneously and route them based on the destination address.

As shown in FIG. 1, one distribution port connects to one IN which serves multiple EUs 20. Switched bridger 14 routes packets to each distribution port 1–4 based on the addresses of EUs 20 which are now associated with this port through the IN. Therefore, CO/HE 10 can narrowcast certain information to certain groups of EUs 20. IN 15 then broadcasts these downstream packets to EUs over the distribution network.

For upstream transmission, IN 15 resolves local contention and passes the upstream packets to the distribution port of the switched bridger 14. The bridger then routes the packets. For those packets damaged due to collisions within the IN's local serving area, the bridger 14 has the built-in function to automatically discard those packets. If the traffic is light, certain concentration could also be deployed to allow multiple INs 15 to share the same distribution port of the switched bridger. For upstream transmission, the system of the invention uses each IN 15 to coordinate the upstream traffic and resolve contention in each IN's local serving area independent of other parts of the network.

The signals transmitted between CO/HE 10 and INs 15, and over the distribution network could be either baseband coded signals, uncoded signals or RF signals. To physically maintain full-duplex transmission over the network, the upstream and downstream transmissions are on separate paths (separate RF channels, separate wavelengths, separate codings, or separate physical paths), and will be shared by multiple EUs. Of course, Time Division Duplex (TDD) could also be used for a single bidirectional path with half-duplex transmission. The following discussion assumes that the upstream and downstream transmission are on separate channels (e.g. RF channels).

2. Embodiments of the IN and Methods

Figure 2A:
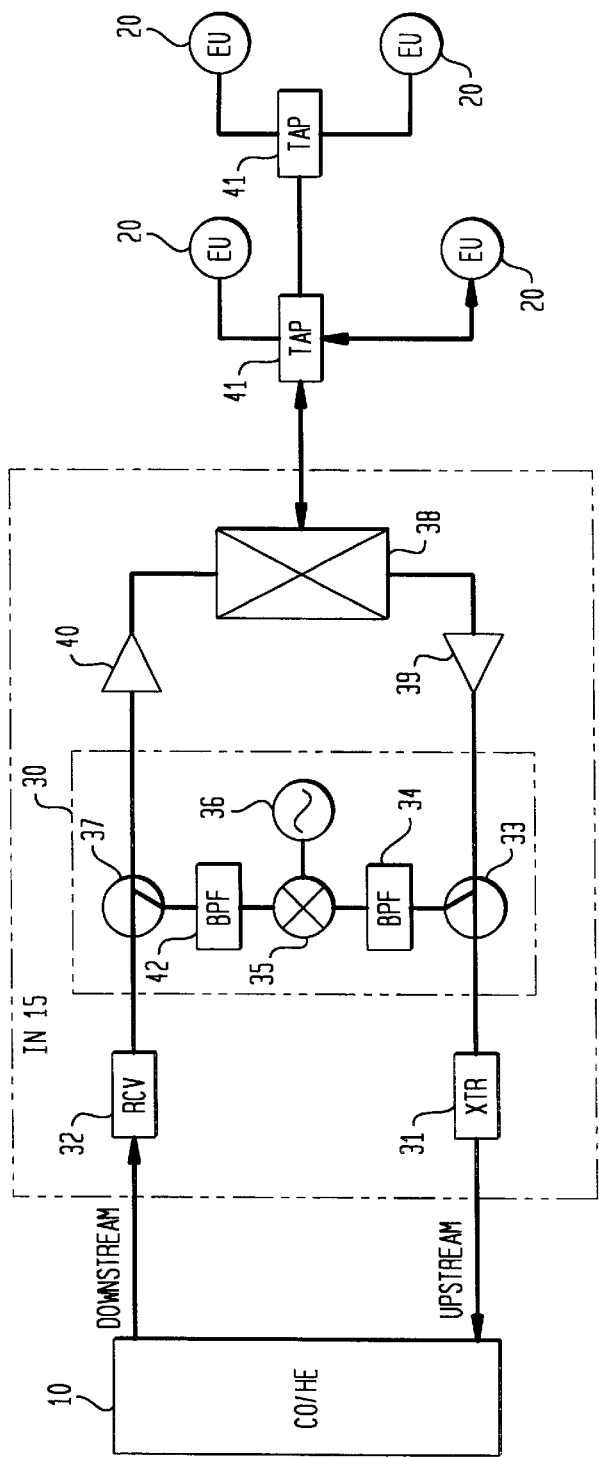
FIG. 2(a) is a block diagram showing an embodiment of the system and FIG. 2(b) is a graph that plots data transmission in relation to frequency.

FIG. 2(a) shows a system incorporating a first embodiment of the IN of the invention. Each IN 15 coordinates upstream traffic by informing each EU 20 of the upstream traffic condition over the bus. Signals transmitted from the EUs to the INs pass through diplexer 38 and amplifier 39. While IN 15 is passing upstream signals to CO/HE 10, it also uses a loop back unit 30 to tap off parts of the upstream signals and loop them downstream over separate signaling channel(s).

Loop back unit 30 includes coupler 33 for tapping off part of upstream signals transmitted from EUs 20 and transmitting it to Band pass filter (BPF) 34. BPF 34 passes selected signals to mixer 35 and local oscillator 36, which work together to up-convert or down convert the signals into the signaling channels selected by BPF 42. The signal is then looped back through coupler 37.

Each EU is connected to a tap 41 that allows distribution of downstream signals to each EU 20 and upstream transmission from each EU 20. When EU 20 has data to transmit, it will listen to the downstream signaling channel(s) first and transmit if nothing is in that channel(s). While transmitting, it will compare the received data in the signaling channel(s) with its transmitted data. If the data are the same, no collision occurs. Otherwise, a collision is assumed, and EU 20 stops transmission and retransmits after a back-off period. The EU 20 could also use the signal level or other information of the looped back signals to monitor the upstream channel status. With the help of the IN 15, the standard CSMA/CD protocol is realized locally within the IN's serving area and without having other parts of the network (such as CO/HE) involved. Transmitter 31 is provided for transmitting upstream data to the CO/HE 10 and receiver 32 is provided for receiving downstream data from CO/HE 10.

Figure 2B:
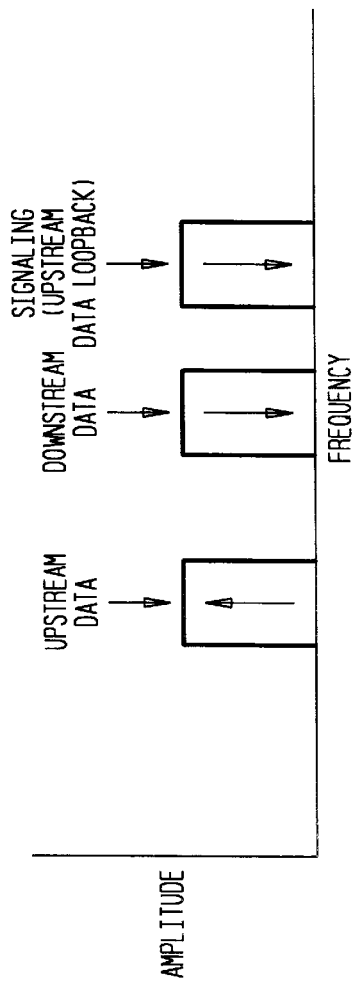

Unlike in conventional Ethernet where any EU's transmission is broadcast to the entire network and each EU uses incoming data traffic to determine the channel status, the system of the invention may have separate upstream and downstream RF channels as illustrated in FIG. 2(b). The horizontal axis in FIG. 2(b) represents frequency and the vertical axis represents amplitude. The EU determines the upstream traffic condition from separate signaling channel(s) and manages its upstream transmission using the standard CSMA/CD protocol independently of downstream data traffic over the bus. Therefore, full-duplex transmission can be realized.

Figure 3A:
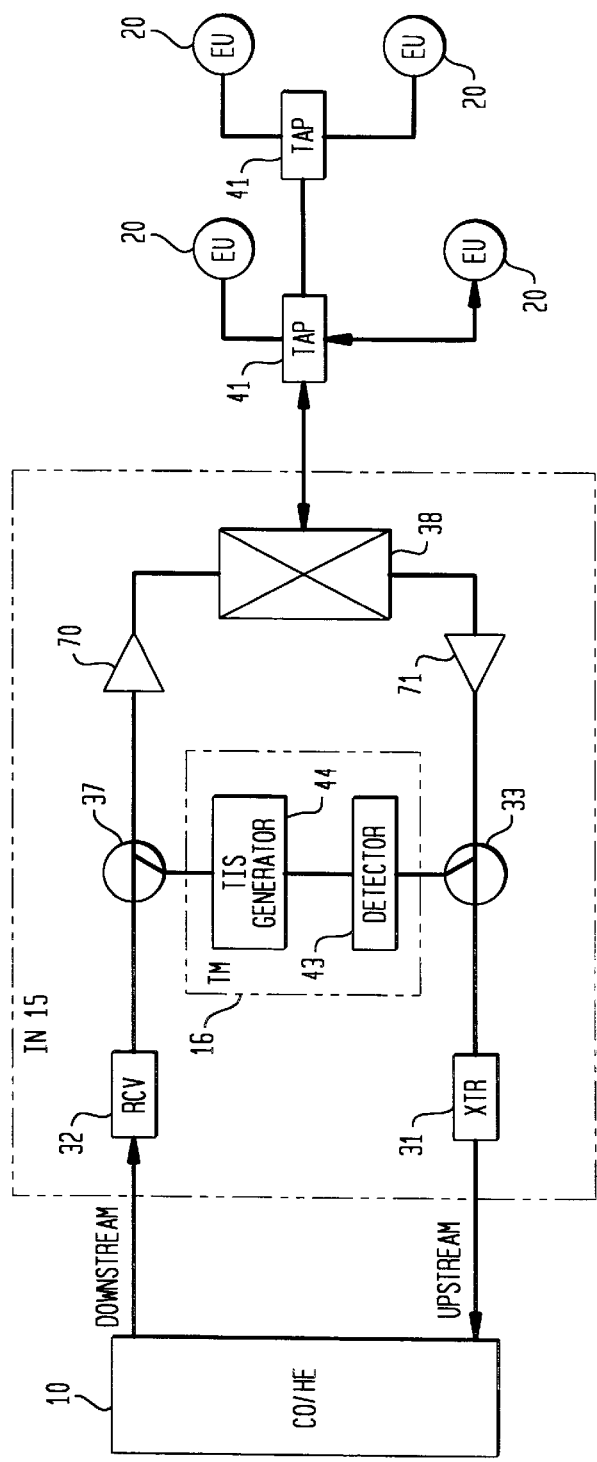
FIG. 3(a) is a block diagram illustrating a further embodiment of the system and FIG. 3(b) is a graph that plots data transmission in relation to frequency.

A second embodiment of the system of the invention is shown in FIG. 3(a). The second embodiment differs from the first embodiment in that traffic information signals (TIS) are generated at IN 15. Signals from EUs 20 are transmitted through taps 41 and reach IN 15 at diplexer 38. The coupler 33 taps off parts of the signals which are detected by the traffic monitor (TM) 16. TM 16 detects the upstream signal (s) with detector 43 to trigger a signal generator 44 to generate narrowband Traffic Information Signal(s) (TIS). The TIS may be merely an RF tone. The TIS signal is looped back through coupler 37, amplifier 70 and diplexer 38 to EUs 20.

Figure 3B:
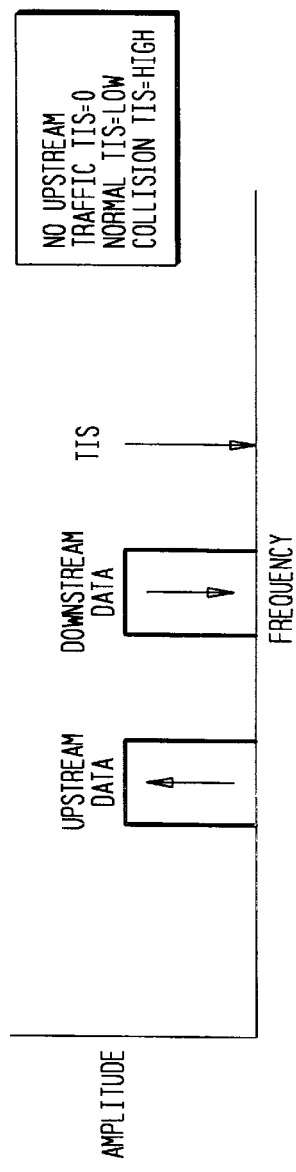

IN 15 transmits the TIS(S) downstream over separate signaling channel(s) as illustrated in FIG. 3(b) to indicate the traffic condition in the upstream channels. The horizontal axis in FIG. 3(b) represents frequency and the vertical axis represents amplitude. Three traffic scenarios are possible: (1) If there is no traffic in the upstream channels, the TM 16 detects no upstream signals and generates no TIS; (2) If there is only one EU transmitting packets upstream, the TM detects a normal RF signal level and generates a low-level TIS to indicate channel busy; and (3) If there is collision due to multiple EUs sending upstream signals simultaneously, the TM detects a higher RF level in the upstream data channel and generates a high-level TIS to indicate collision. The TM 16 could also use the information in the upstream packet (i.e. address or packet pattern) or other information related to the upstream transmission to determine the upstream traffic condition. Interpretation of the TIS by the EUs is disclosed in conjunction with FIG. 4(b) below.

Figure 4B:
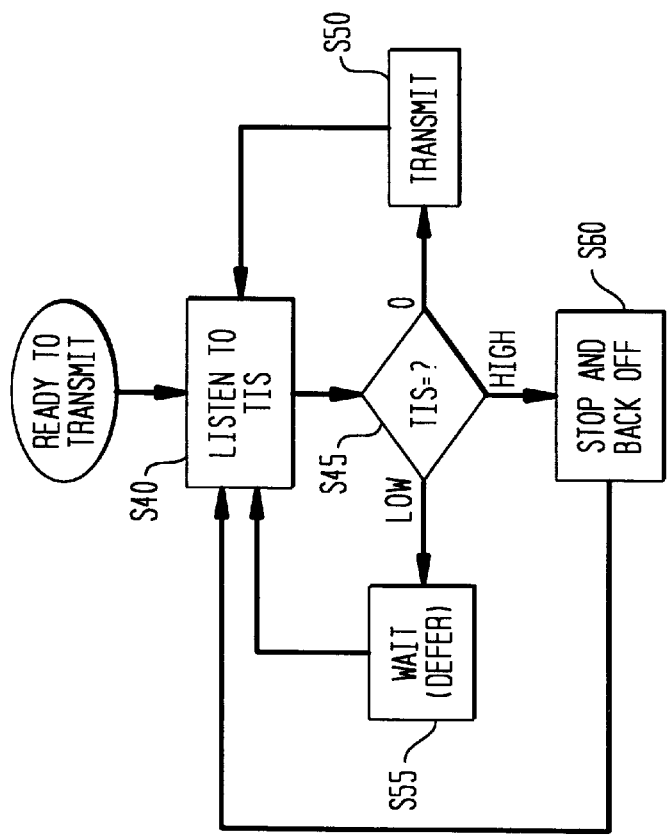
FIG. 4(a) is a flow chart showing a method of traffic monitoring for the system of FIG. 3(a) and FIG. 4(b) is a flow chart showing the method followed by the end user for responding to traffic information signals.
Figure 4A:
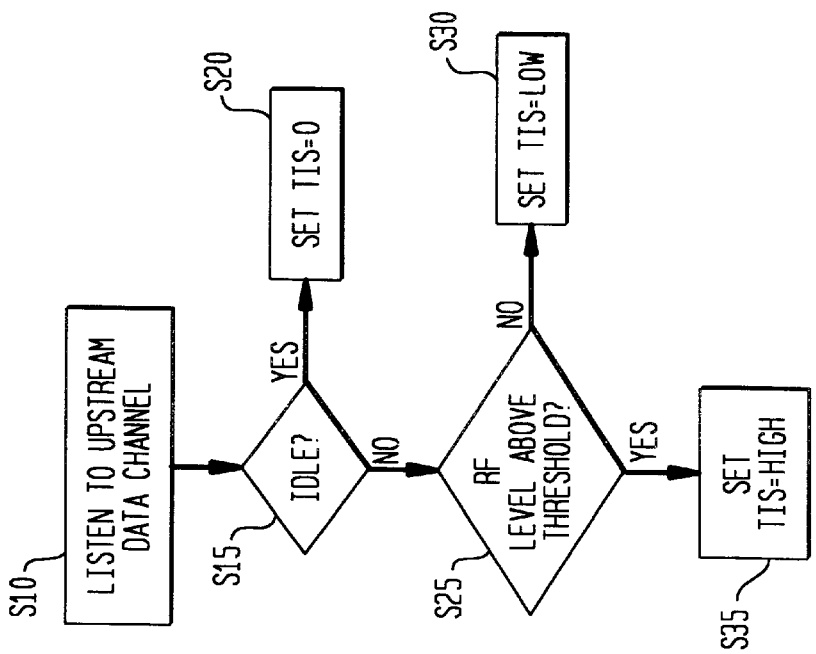

FIG. 4(a) is a flowchart illustrating a method used by the INs of FIG. 3(a). At S10, IN 15 listens to the upstream data channel. At S15, IN 15 determines if the upstream data channel is idle. If the channel is idle, IN 15 sets the TIS equal to 0 in S20. If the channel is not idle, IN 15 determines in S25 if the RF level is above a specified threshold. If the RF level is not above the specified threshold, the IN sets the TIS to low in S30. If the RF signal is above the specified threshold, the IN sets the TIS to high in S35. The specified threshold is set in accordance with the parameters of the system.

FIG. 4(b) is a flowchart illustrating the process followed by an EU in the system of FIG. 3(a). The EUs receive the TIS generated by the INs, as disclosed in conjunction with FIG. 4(a), to enable the CSMA/CD protocol. At the EU site, EU 20 listens at S40 to the TIS whenever it has packets to send upstream. In S45, EU 20 determines whether the TIS is zero, high or low. If the TIS is zero, EU 20 transmits in S50. If the TIS is low, EU 20 waits (defers transmission) in S55. If the TIS is high, EU 20 stops and backs off at S60 if it is already transmitting.

In order to avoid the situation in which one EU's signal is stronger than two "weak" EUs' signals adding together, certain RF level control is needed. One approach is to send a pilot signal downstream as a reference for each EU to adjust its upstream signal level such that the received signal level at IN 15 from each EU 20 is substantially the same.

Figure 5A:
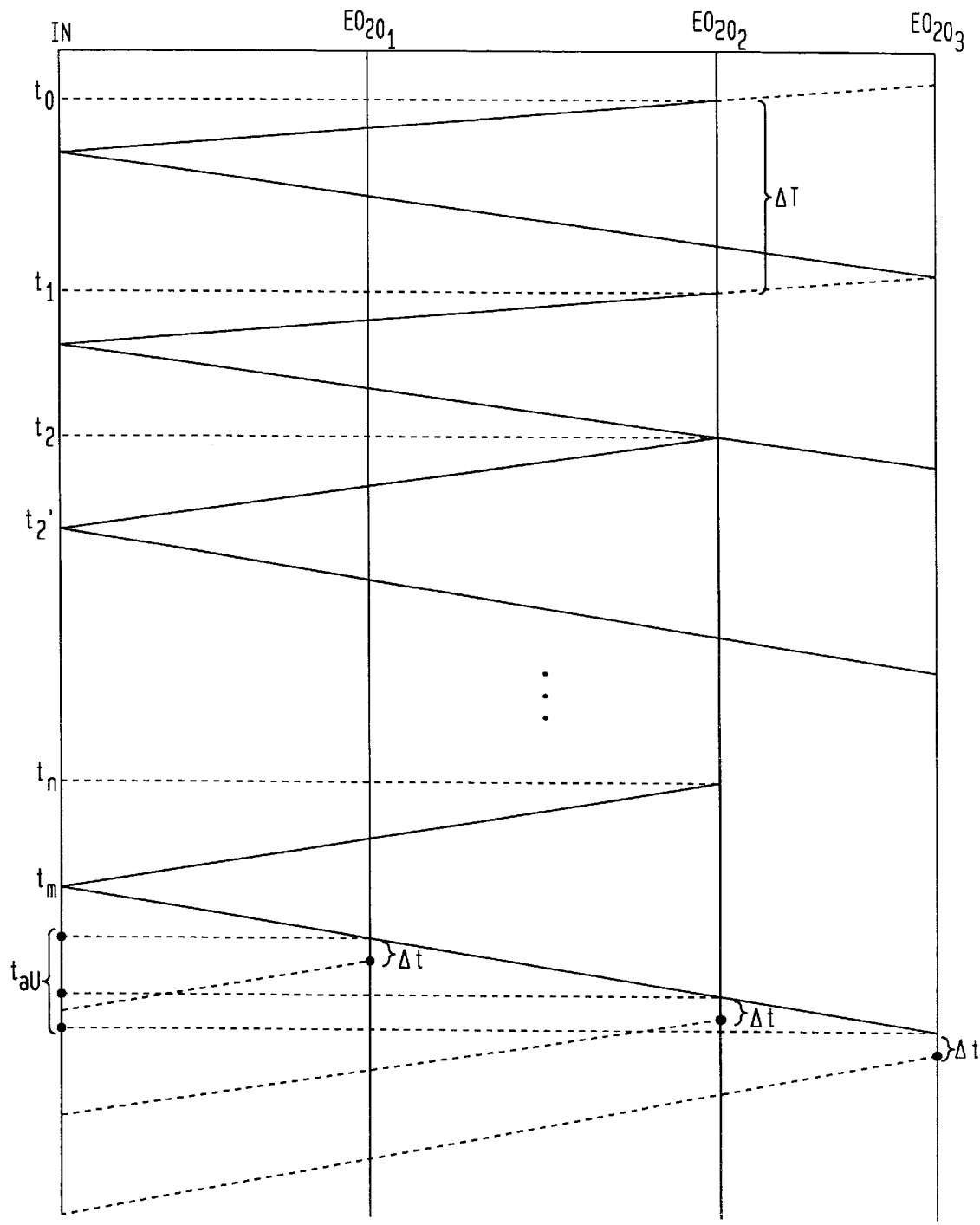
FIG. 5(a) is a diagram illustrating another embodiment of the method of the invention in an in-band signaling case and FIG. 5(b) is a diagram illustrating an embodiment of the method in an out-of-band signaling case and 5(c) illustrates a further out-of-band signaling case.
Figure 5B:
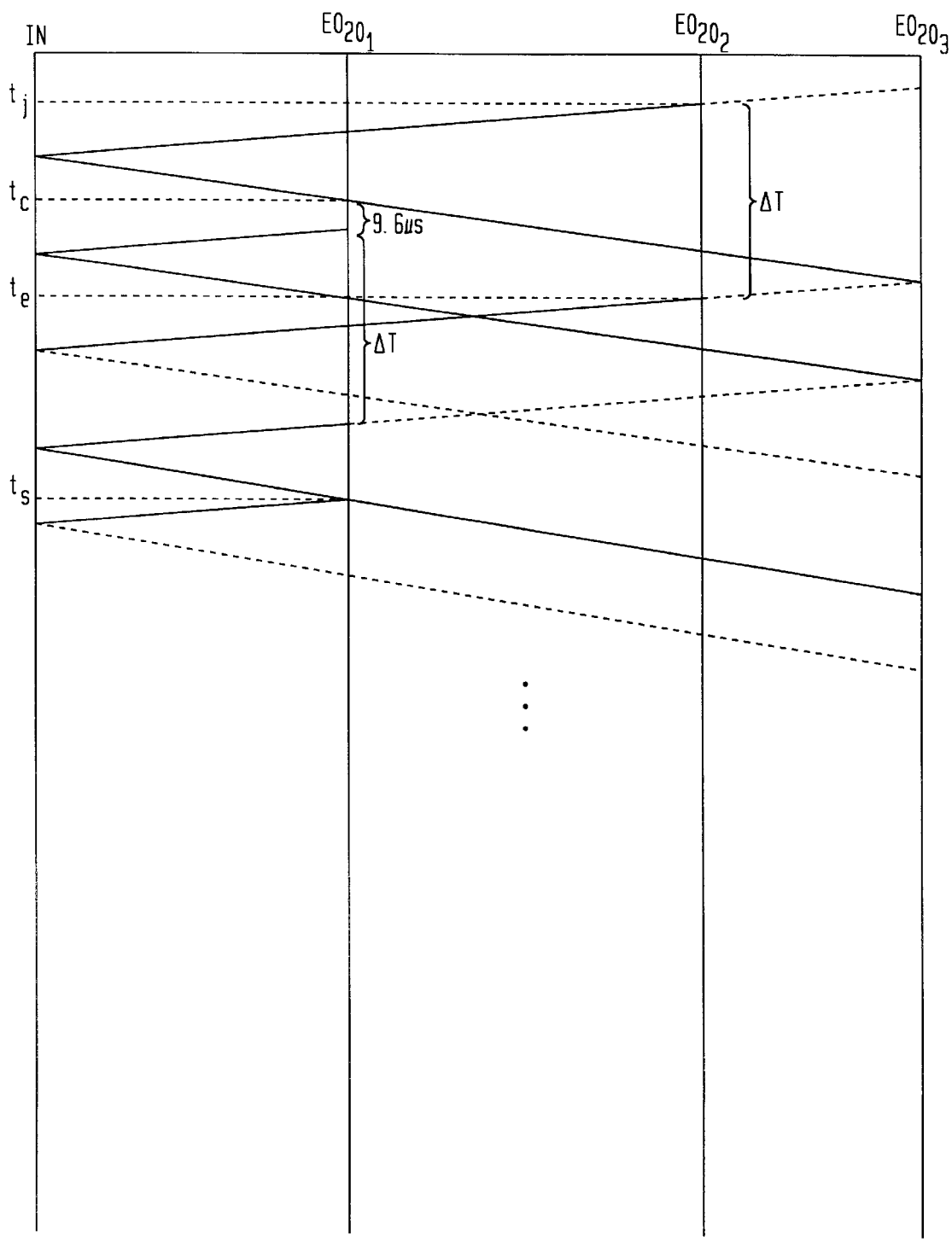
Figure 5C:
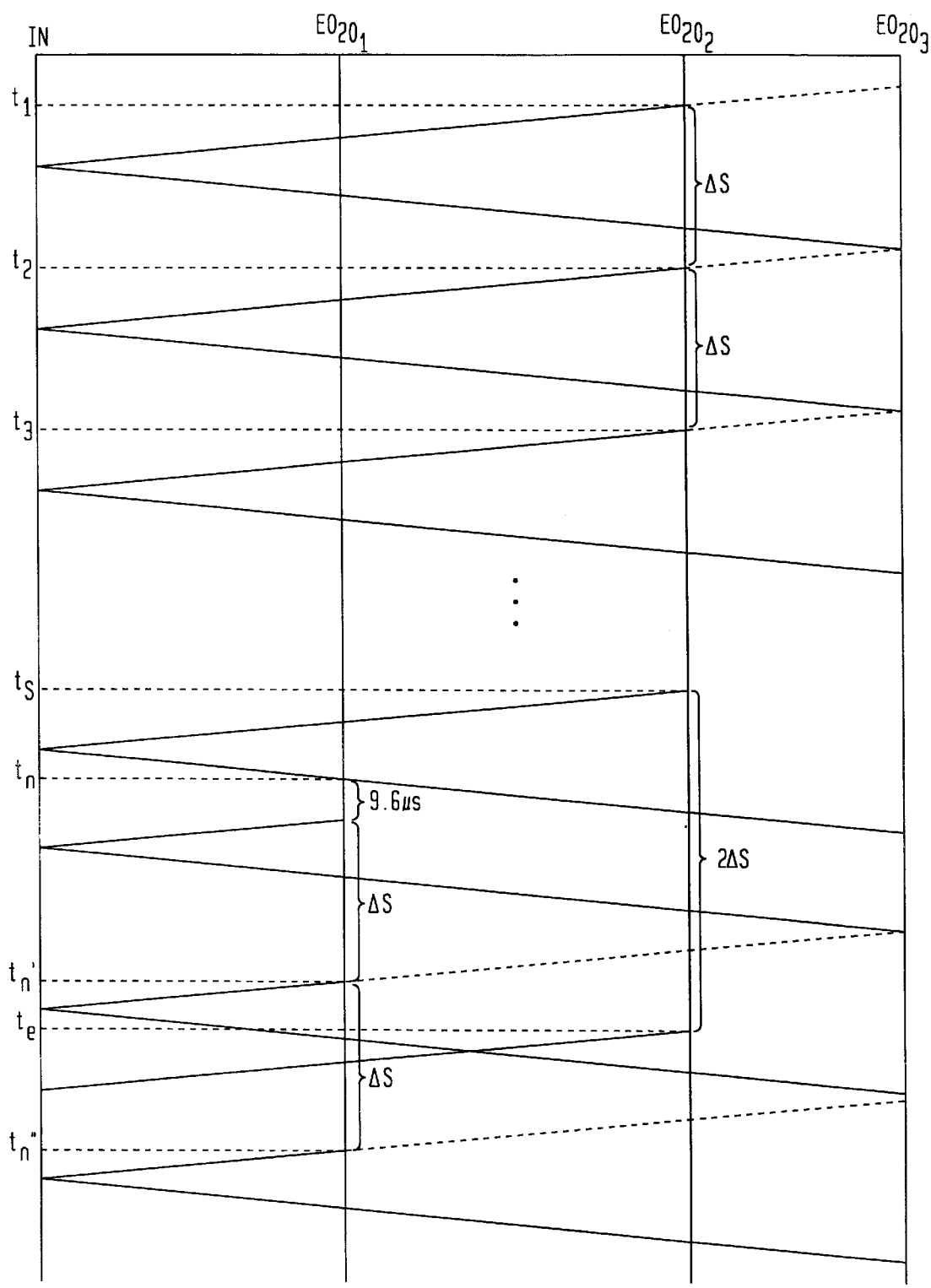

FIGS. 5(a)–5(c) illustrate a third embodiment of the method of the invention in which the system may have substantially similar components to the system of FIG. 2(a) or FIG. 3(a). FIG. 5(a) illustrates an in-band signaling scenario, FIG. 5(b) illustrates an out-of-band signaling scenario, and FIG. 5(c) illustrates a further out-of-band signaling scenario. In the in-band scenario, upstream signaling is sent within the upstream data channel and in the out-of-band scenarios upstream signaling is sent outside the upstream data channel.

As illustrated in FIGS. 5(a)–5(c), when EU 20 has data to transmit and the upstream channel(s) is free as indicated by the downstream signaling (to be discussed below), the EU will send its address upstream in a narrowband channel before sending the data. The address is preferably a small packet relative to the data packet.

IN 15 then loops that address-signaling downstream in another narrowband signaling channel which all the users are listening to. If the transmitting EU gets its address back without error, no collision occurs. It will then start transmitting data. Otherwise, the distorted address indicates collision, and the EU will not transmit data and will back off.

In the in-band signaling case shown in FIG. 5(a), in which the signaling transmission is within the upstream data channel (i.e. RF channel), the address-signaling packet needs to have a length longer than the round trip delay between the IN and the furthest EU in order to make sure all the EUs can detect collision or channel busy if they attempt to transmit within the round-trip time period (signaling period). The address-signaling packet might be followed by a certain pad (additional bit stream). The purpose of the pad is to prevent an EU 20, which is closer to IN 15, from falsely detecting channel idle and starting transmission in the "quiet" time period (if no pad is present) when the further EU's address-packet looped back by the IN has passed this closer EU but before the further EU has gotten all the address back and hence begins transmitting data.

At $t_0$ EU $20_2$ begins transmitting address signaling. At $t_1$, it finishes sending the address and starts sending the pad. At $t_2$, EU $20_2$ receives the full address back from IN 15 and if the address is correct, stops sending the pad and starts transmitting data. At $t_2'$, IN 15 sends a TIS triggered by end user EU $20_2$'s data. At $t_n$, EU $20_2$ finishes sending data. IN 15 receives the end of EU $20_2$'s data packet at $t_m$ and stops sending the TIS. After this point, at $t_{all}$, the users detect the channel as idle and after $\Delta t$ start sending addresses if they have data to transmit. In FIG. 5(a), $\Delta T$ illustrates a maximum round trip delay. $\Delta t$ is the time interval between EU 20 detecting the end of another user's transmission (channel idle) and the time it starts sending its address. To be compatible with IEEE 802.3, $\Delta t$=9.6 $\mu s$.

In the following circumstances, the pad is unnecessary: (1) if the EU transmission algorithm is adjusted such that it would not transmit within a certain time period after the passing address-packet ended; or (2) if the round trip delay between the IN and the furthest EU is less than the inter-packet guard time (9.6 $\mu s$). This is because the IEEE 802.3 standard (built on the EU's Ethernet card) only allows the EU to start transmission 9.6 $\mu s$ after the passing packet ends. Therefore, even if there is some "quiet" time period, the EU closer to the IN will detect the TIS before it can start transmission. When the EU gets the correct address back and starts transmitting data, IN 15 will use the data signal to trigger a TIS and transmit it downstream in the signaling channel to indicate that the upstream channel is busy. This TIS could be some predefined packet stream or a simple RF tone. It will cease as soon as the IN detects no traffic over the data channel.

In an out-of-band signaling case as shown in FIGS. 5(b) and 5(c), an EU will follow the address with a TIS which is either a predefined packet stream or an RF tone and transmitted in the upstream signaling channel outside the data channel. The IN then loops them downstream in the downstream signaling channel.

In out-of-band signaling, the length of the address packet does not have to be larger than the round trip delay, but the total length of address and pad and/or TIS needs to be longer than the round trip delay. If the address length is less than the round trip delay, the EU closer to IN will have the advantage in accessing the channel. Therefore, to keep fair access, it is preferred to keep the address packet length longer than the round trip delay.

There are several scenarios to implement the out-of-band signaling:

(1) The EU sends an address followed by a pad or TIS before sending the data. The EU could also send an address followed by both a pad and a TIS. The IN loops back the address and pad and/or TIS. The EU ceases the pad or TIS and starts transmitting data when it gets the correct address back. The IN then uses the data stream to trigger a TIS and send it downstream in the signaling channel to indicate channel busy. This scenario is similar to the in-band signaling case, except that the address does not have to be longer than the round trip delay as mentioned before.

(2) The EU starts transmitting data when it gets the correct address back and continuously transmits the TIS in the upstream signaling channel. The IN also continuously loops back the TIS in the downstream signaling channel. The EU stops the data and TIS simultaneously. Once again, this is similar to in-band signaling case and scenario #1.

(3) The EU starts transmitting its address, TIS and data the same way as in (2). However, it stops transmitting the TIS $\Delta T$ before finishing data transmission where $\Delta T$=the time required to send the address packet. As shown in FIG. 5(b), EU $20_2$ stops sending the TIS at $t_j$; and EU $20_1$ detects channel idle at $t_c$ and start sending address at $t_c$+9.6 $\mu s$. The EU$20_2$ stops transmitting data at $t_e$ where $t_e$=$t_j$+$\Delta T$. The EU$20_1$ gets the correct address back at $t_s$ and starts data transmission.

(4) The EU transmits its address followed by the TIS. It will start transmitting data after it gets the correct address back and after it finishes sending the TIS for $\Delta s$ time period where $\Delta s$=time necessary to send an address packet, regardless of the EU's physical location and regardless of whether it gets the address back earlier. The EU will cease the TIS transmission 2$\Delta s$ before terminating data transmission. Therefore, the total length of address+TIS is equal to the total length of the data packet. As shown in FIG. 5(c), EU$20_2$ starts sending the address at $t_1$, starts sending the TIS at $t_2$, $t_2$-$t_1$=time necessary to send the address packet ($\Delta s$). It starts sending data at $t_3$,$t_3$-$t_2$=time to send the address packet ($\Delta s$). At $t_s$, the EU$20_2$ stops sending the TIS and at $t_n$, EU$20_1$ detects channel idle and starts sending its address 9.6 $\mu s$ later. At $t_n'$, EU$20_1$ sends TIS where $t_n'$=$t_n$+9.6 $\mu s$+$\Delta s$. At $t''''$, EU$20_1$ sends data $t_n''$=$t_n'$+$\Delta s$. At $t_e$ EU$20_2$ finishes data transmission, where $t_e$-$t_s$=2$\Delta s$.

In both (3) and (4) the EU which is transmitting data releases the signaling channel to allow other EUs to test the upstream channel conditions before its data transmission ceases. This gives out-of-band signaling more efficiency than in-band signaling. With either in-band or out-of-band signaling, the CSMA/CA algorithm is locally realized (e.g. w/out the assistance of the CO), and the data packets never collide.

In the out-of-band signaling cases the address-signaling (address+TIS or pad) could also be transmitted simultaneously with the data. Upon receiving the address back, the EU could either continue to transmit data and the TIS, or stop transmission and back off. Therefore, normal CSMA/CD is realized. The above four scenarios could all be used in this case.

In all the in-band and out-of-band cases, the EUs could also use the looped back address's amplitude or other information to determine the upstream channel condition. It should be noted that the so-called "address" could be merely an RF tone or other signals from which the channel condition can be determined.

All the above algorithms could have downstream signaling channel(s) separate from downstream data channel(s). Upstream and downstream transmission are independent of each other. Therefore, full-duplex operation is realized.

Figure 6:
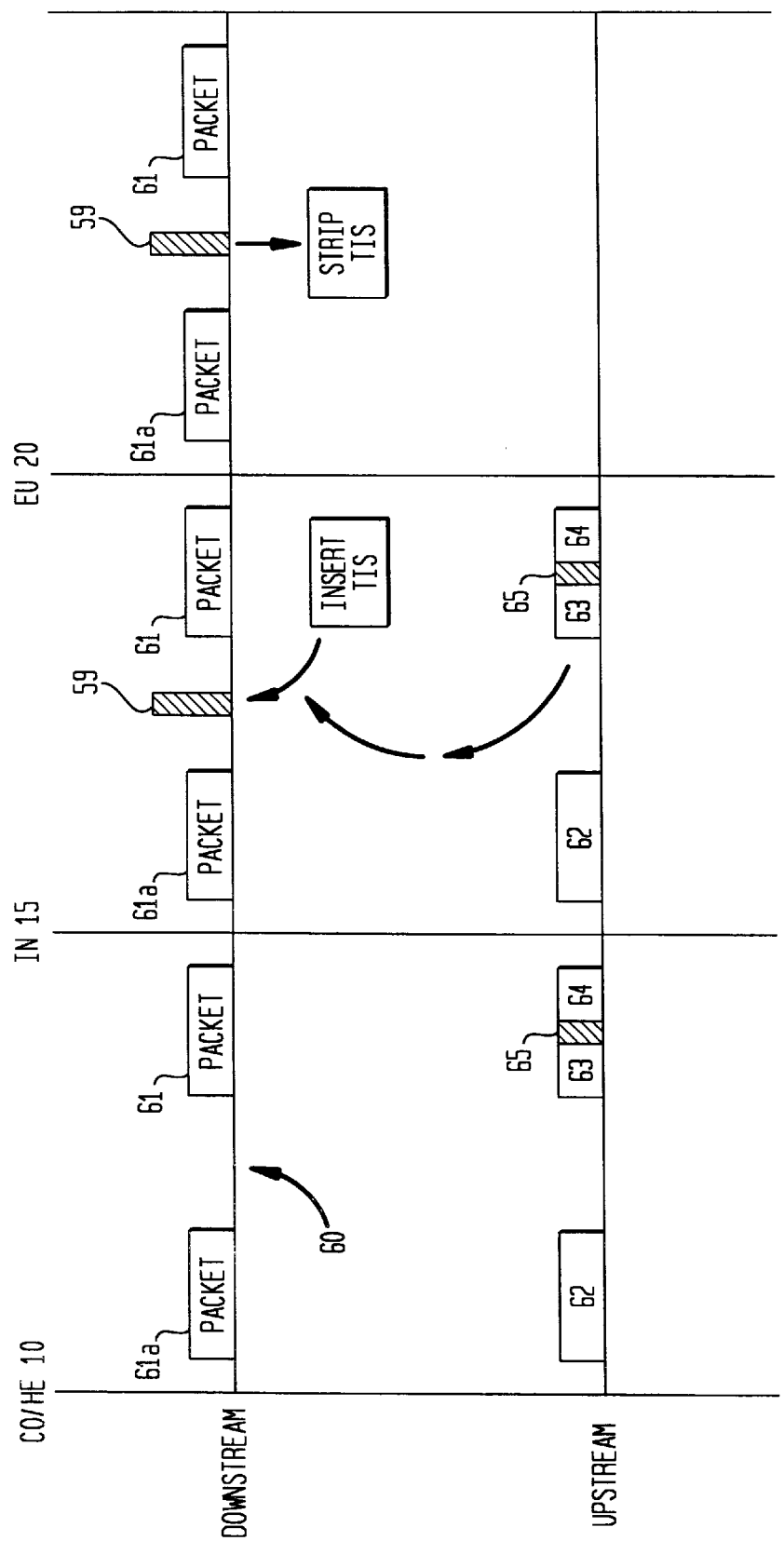
FIG. 6 is a diagram illustrating an embodiment of the method employing half-duplex transmission.

In a further embodiment of the invention, the downstream signaling could use the same channel as the downstream data. As shown in FIG. 6, CO/HE 10 could continuously send downstream packets 61, 61a but leave relatively larger guard bands 60 between the packets. The IN 15 could then use the "quiet" time during the guard bands in the downstream channel to insert the traffic information signaling 59. EU 20 then receives the traffic information signaling and data in the same RF channel but only uses the signaling as the upstream traffic indication instead of using the downstream data traffic as in conventional Ethernet CSMA/CD protocol. Data packet 62 is successfully transmitted upstream. Data packets 63 and 64 collide at portion 65. With this scheme, buffering may be needed at the IN, EU or CO/HE.

As shown in FIG. 6, except for bandwidth and efficiency reduction, the upstream and downstream transmission are still independent of each other, therefore maintaining full-duplex operation. Another scenario is to implement half-duplex operation where the CO/HE only transmits downstream packets in certain time periods, and stops transmission in other periods for upstream transmission and traffic control. The upstream and downstream could therefore occupy the same RF channel.

Figure 7:
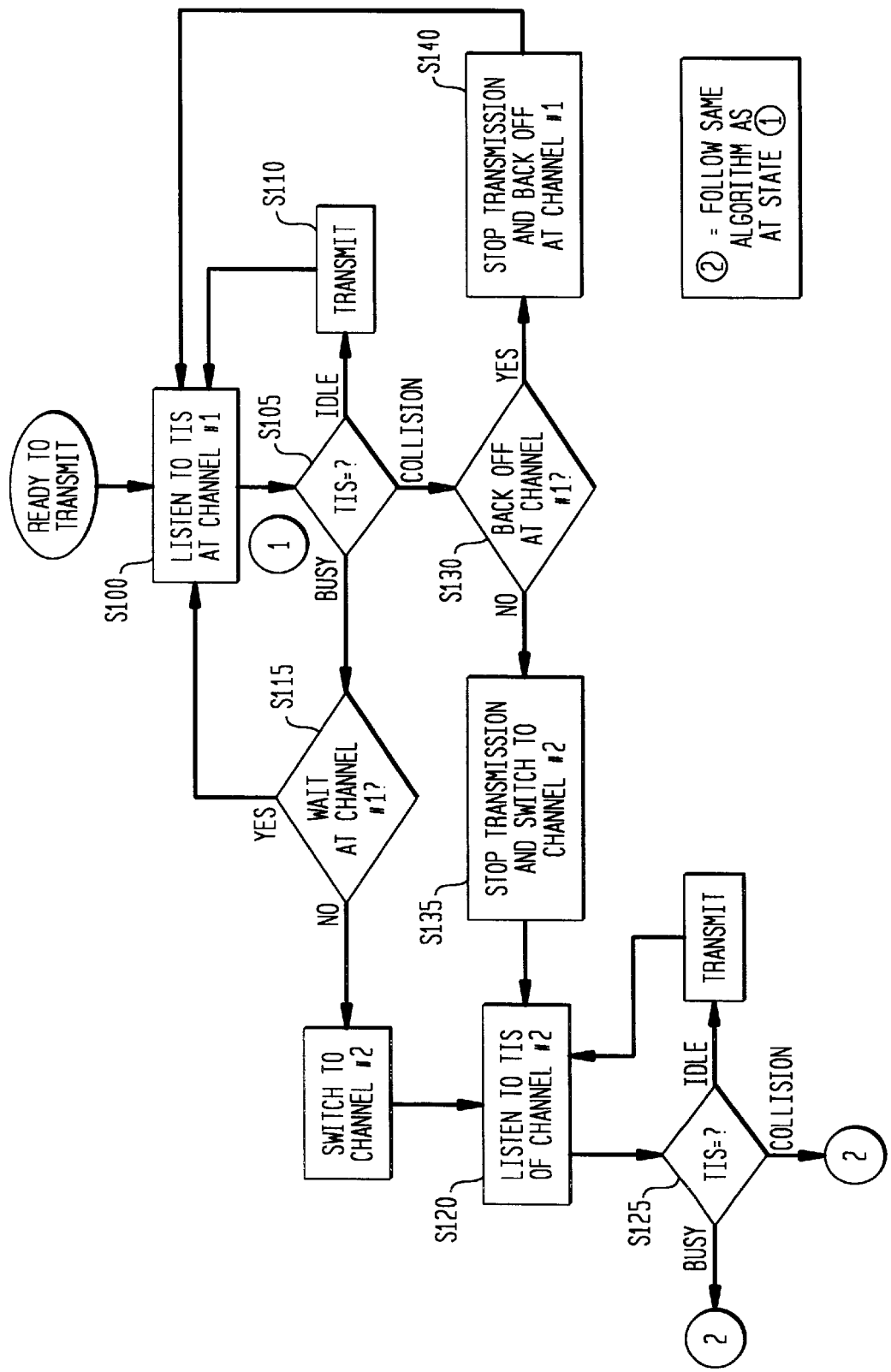
FIG. 7 is a flow chart illustrating a further embodiment of the method in which multiple channels are used for upstream transmission.

FIG. 7 is a flow chart illustrating a method in which multiple RF channels are used for upstream transmission. When one RF channel is busy, the EUs could choose to: (1) stay in the same RF channel, waiting or backing off until the channel is free; or (2) switch to another upstream RF channel and proceed with the same algorithm by listening to that channel's signaling (In this case, multiple signaling channels are needed). This increases the overall transmission efficiency.

In S100, EU 20 listens to the TIS at channel 1. At S105, EU 20 determines whether the TIS signal indicates idle, busy, or collision.

If the signal indicates idle, EU 20 transmits at S110.

If the TIS signal indicates busy, a decision is made at S115 to determine whether to wait at channel 1 or switch to channel 2. If EU 20 waits at channel 1, it returns to listening status in S100. If EU 20 switches to channel 2, it listens in S120 to the TIS of channel 2. The TIS indication is determined at S125. If the indication is idle, EU 20 transmits over channel 2. If the indication is busy or collision, EU 20 follows the steps that it would follow after S105.

While transmitting, if the indication is collision at S105, a decision is made to determine in S130 whether to back off and resume listening on channel 1 or switch to channel 2. If channel 2 is preferable, EU 20 stops transmission and switches to channel 2 in S135. EU 20 then proceeds to S120 to listen to the TIS at channel 2. Alternatively, at S140, EU 20 stops transmission and backs off at channel 1 and returns to S100 to resume listening on channel 1.

The CO/HE or the IN could also send certain signaling to EUs to allocate certain groups of EUs to transmit at certain channels and other groups of EUs to transmit at other channels.

In any of the aforementioned embodiments, the traffic load on each RF channel could be dynamically adjusted. For example, if one user wants to initiate a high-priority transmission requiring low delay, it could send upstream a high-priority signaling, which includes its address and priority information, before (using CSMA/CA protocol) or simultaneously with (using CSMA/CD protocol) data transmission. IN 15 then loops back that signal or sends a special TIS (triggered by that signal) in the downstream signaling channel, indicating high-priority traffic will occur in this upstream data channel. The priority information could be a predefined pattern of extra bits before and/or after the address, or could be an RF tone with a level increased above a certain threshold. Upon receiving—that special signaling, all the users who do not have high-priority packets will adjust their algorithm to have less, or even zero, probability to transmit in that channel. In the case that this high-priority EU's signaling (and data) collides with other EU's signaling (and data), the high priority EU will re-transmit immediately without backing off while other normal users will back off or move to other channels. This therefore gives the high priority user more capacity/efficiency and low delay.

This priority strategy could also apply to the single-RF-channel case, in which each EU's MAC protocol would be adjusted such that when collisions occur, the high-priority EU will re-transmit immediately or back off for a small amount of time while normal EUs will back off normally or back off for much longer time.

Similarly, a reservation-like algorithm could also be implemented for special users together with a contention algorithm (CSMA/CD or CSMA/CA). For example, user A requires constant bit rate transmission. It then sends upstream the priority message as mentioned before to compete with other users based on the same contention protocol (CSMA/CD or CSMA/CA). As soon as this user gets the channel in which the EU and IN 15 receive a complete and undistorted signaling, IN 15 would put this message into a buffer or memory. The IN would then send that message over the downstream signaling channel periodically. The period could be N×packet interval. The Ethernet uses variable packet size, but the packet interval and N could be determined by the system operator. Upon receiving that message, the special EU would send its packets while other EUs 20 stop transmission if they are transmitting. With this arrangement, the special EU can always transmit in the-reserved time slot controlled by the network (IN), thereby achieving constant bit rate transmission. Other users can only compete for the channel when the signaling is not presented and the upstream channel is free. The reservation cycle could be ended by another signaling from user A.

To simplify IN 15, it is advantageous that complex functions are not implemented within the IN. The above priority and reservation scheme could be deployed more flexibly at the CO/HE. Also, allowing EU 20 to make a reservation or request for high priority could be pre-determined or dynamically assigned by the network. This can be done by enabling or disabling the capability of sending priority-signaling in each EU's Customer Premises Equipment (CPE) at either the initialization stage or dynamically, based on request. The CO/HE could use both upstream data and signaling channels to get the EUs' information and use the downstream signaling and/or data channels to control each EU's transmission/receiving function.

3. Hardware Implementations

The invention can be implemented independently of network topology and the EU could access the network using a standard Ethernet card.

Figure 8A:
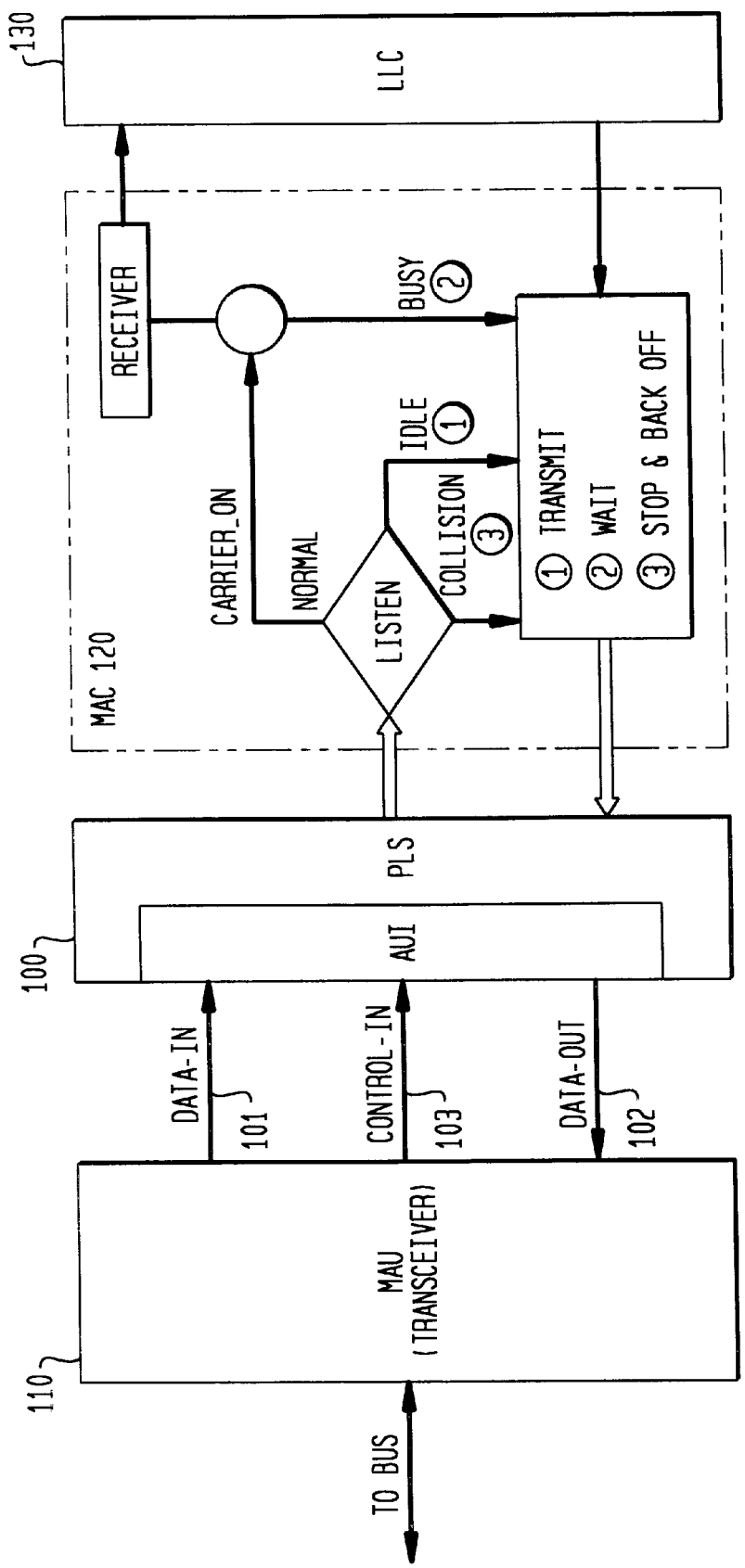
FIG. 8(a) illustrates a standard Ethernet system and FIGS. 8(b) and 8(c) show the data format of standard Ethernet.

FIG. 8(a) shows a standard Ethernet user terminal. A typical Ethernet card includes three major function-related segments below Logical Link Control (LLC) 130. Physical Layer Signaling (PLS) 100 handles data packaging and coding/decoding. It has three physical interface wire pairs to the transceiver or medium attachment unit (MAU 110): Data_In 101, Data_Out 102 and Control_In 103. PLS 100 receives the input data from MAU 110 over Data_In 101, decodes it, and passes it to a MAC 120. It passes output data from MAC 120 to MAU 110 over Data_Out 102.

In the process of receiving data, MAC 120 generates Carrier-On to indicate channel busy (carrier sense). MAC 120 handles the CSMA/CD protocol, up-interfaces to LLC 130, and down-interfaces to PLS 100.

While transmitting, MAU 110 monitors the bus and sends a signal quality message to PLS 100 over Control_In 103 to indicate collision and channel busy. The MAU directly interfaces with the network, transmits and receives data, and monitors the bus.

Principally, the transmitting and receiving functions are independent of each other. Nevertheless, in standard Ethernet, because two-way transmission takes place on the same transmission path over the bus, one computer's transmission occupies the whole channel and is broadcast to the entire network. Therefore, other computers which have data to transmit will stay at listening mode and defer their transmission. However, everyone can start transmitting after the passing packet on the bus ends (plus the interpacket guard time of 9.6 µs) regardless of whether there will be another packet over the bus or not. If there is another packet, collisions will occur, and everyone will back off according to the CD procedure. Therefore, even though the algorithm allows the Ethernet card to transmit and receive at the same time, in reality, in conventional Ethernet, one EU cannot transmit and receive uncorrupted data simultaneously. This results in half-duplex operation.

There are three types of baseband Ethernet. 10Base5 and 10Base2 use coaxial buses (thick coax and thin coax). 10BaseT uses RJ45 twisted pairs (TP) to connect multiple EUs to an non-switched hub which broadcasts any user's upstream signals to all the other users. Therefore, even though the upstream and downstream are carried over two separate wire pairs, the network logically is a bus. Typically, the 10BaseT and 10Base2's MAUs are integrated on the Ethernet card with an RJ45 port to connect TP, and BNC to connect coax. The 10Base5 uses an external MAU which interfaces to the Ethernet card over an Attachment Unit Interface (AUI) port. The interface lines on the AUI are: Data_In, Data_Out, and Control_In as described above. The 10BaseT and 10Base2 could also use external transceivers (MAUs) which interface with the Ethernet card's AUI, and connect to the medium (bus) with either an RJ45 port for TP or BNC for coax. The implementation of the invention may vary depending on the type of element.

In 10BaseT, to maintain the link integrity (to ensure that the communication link is not dead) between the PC and the hub/bridger, the MAUs of the hub/bridger and the Ethernet card have the function of periodically sending a short pulse over the outgoing pair to the other party. Upon receiving the pulse, the receiving party will respond with another pulse. If one of the parties does not receive the pulse within a certain time period, it will assume the link is dead and terminate data transmission.

Figure 8B:
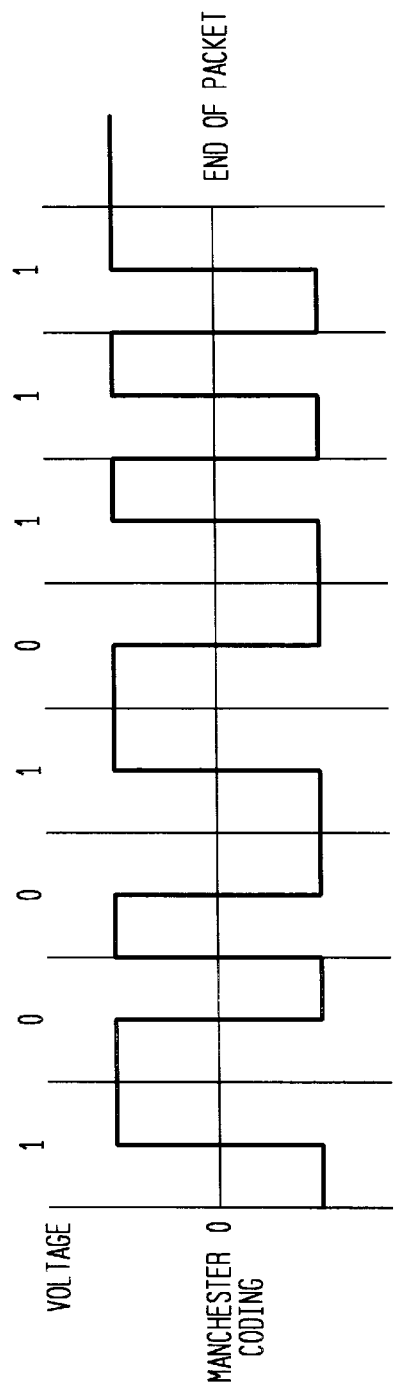
Figure 8C:
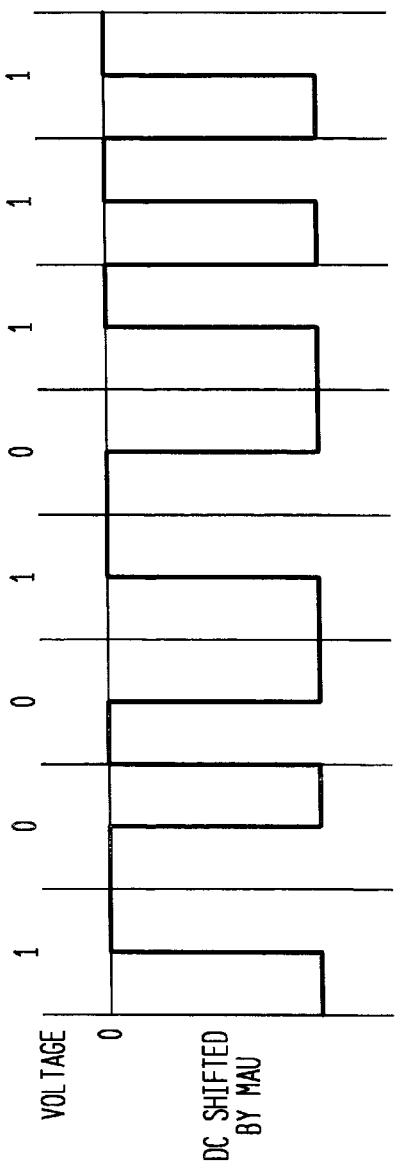

FIG. 8(b) illustrates standard Ethernet three-level Manchester coding. The end of packet is indicated by remaining high for two bit periods, followed by zero voltage. The 10BaseT MAU directly transmits this signal over the TP. In baseband coax systems, 10Base5 or 10Base2, the Ethernet transceiver DC shifts the 3-level Manchester coded signal to become a 2-level signal and marks the end of packet by enforcing the voltage return to zero as shown in FIG. 8(c). The aforementioned signals are standard signals transmitted over a network between two computers.

With the invention, in baseband systems using TP, coax or fiber, the 3-level Manchester coded signals or the 2-level signals could be directly transmitted over the medium in the same way as in standard Ethernet.

In RF systems, one common approach is to convert the 3-level Manchester code back to Non-Return-to-Zero (NRZ) and use an RF modulation technique such as QPSK or QAM to transmit the data. This requires synchronization/clock recovery at the receiver, yet uses burst-type packet transmission. In systems such as mFN-HFC, the clean and large bandwidth make it possible to use a much simpler modulation/demodulation scheme. The 2-level signal (converted from 3-level signal using the MAU) may be directly applied to the RF carrier: a modulation format called On-Off-Keying (OOK). Because the packet is ended with voltage returning to zero, which will shut off the RF carrier, the automatic burst mode of operation is also realized. At the receiver side, instead of deploying synchronization/clock recovery, simple envelop detection is used to recover the 2-level signals which are then converted back to 3-level Manchester-coded signals using the MAU's existing function. The Manchester signal is self-clocking.

In 10Base 5 or 2, because of the shared coax bus, the user will automatically receive its own transmission over the bus. In 10BaseT, although it has separate physical two-way paths, the network implementation logically is a bus. In order to emulate what happens in 10Base5 or 2, the 10BaseT transceiver loops the transmitted data packet back to the receiver port. In other words, in the typical Ethernet implementation, the Ethernet card expects to see a signal on the Data_In line when it puts data on the Data_Out line. To realize full-duplex operation, the first step is to disable the loop-back function, which can be done by modifying the driver software.

Unlike conventional Ethernet in which two-way transmission takes place over the same logical path, the invention may use networks that have separate upstream and downstream transmission paths. Therefore, full-duplex or semi-full-duplex operation can be achieved with or without modification to a standard Ethernet card.

In a semi-full-duplex scheme, the conventional Ethernet card is used. As shown in FIG. 8(a), the PLS 100 interfaces with MAU 110 using an AUI port with the same Data_In, Data_Out and Control_In circuits. The conventional MAU is modified such that it receives the outgoing data from PLS over Data_Out and transmits it over the network upstream channel(s). It also receives downstream data from network downstream channel(s) and presents it to the PLS over the Data_In circuit. With the loop-back function disabled, the Data_In and Data_Out lines can operate independently. The MAU also interfaces the Control_In circuit with the network downstream signaling channel(s) which could be the same or separate from the data channel(s) as discussed before.

With this arrangement, if there is a packet over the network downstream channel, the MAU will pass it to Data_In for PLS to receive. The MAC then turns on the Carrier-On to prevent the PLS from transmitting an upstream packet over the Data_Out circuit. However, as mentioned before, if the EU has packets to transmit, the PLS will start transmission after the in-coming packet ends plus the interpacket guard time (9.6 µs), regardless of whether there is any following downstream packet or not.

Because the upstream and downstream transmissions are now on separate channels and will never collide, the upstream transmission will continue. If a collision occurs in the upstream channel(s), the MAU will recognize the collision utilizing the downstream signaling channel(s) and send a standard signal quality message to the PLS over the Control_In circuit. The upstream transmission is then stopped. Also, if the downstream channel is idle and the upstream channel is busy, the modified MAU will send a standard quality signal, triggered by the downstream TIS, to the PLS over the Control_In circuit. This then prevents the MAC from initiating upstream transmission without affecting the downstream receiving function. Except for the fact that the upstream transmission cannot start when a downstream packet comes in first and is being received, the upstream transmission and collision detection are independent of the downstream receiving function. Therefore, semi-full duplex is realized utilizing a standard Ethernet card.

Figure 9:
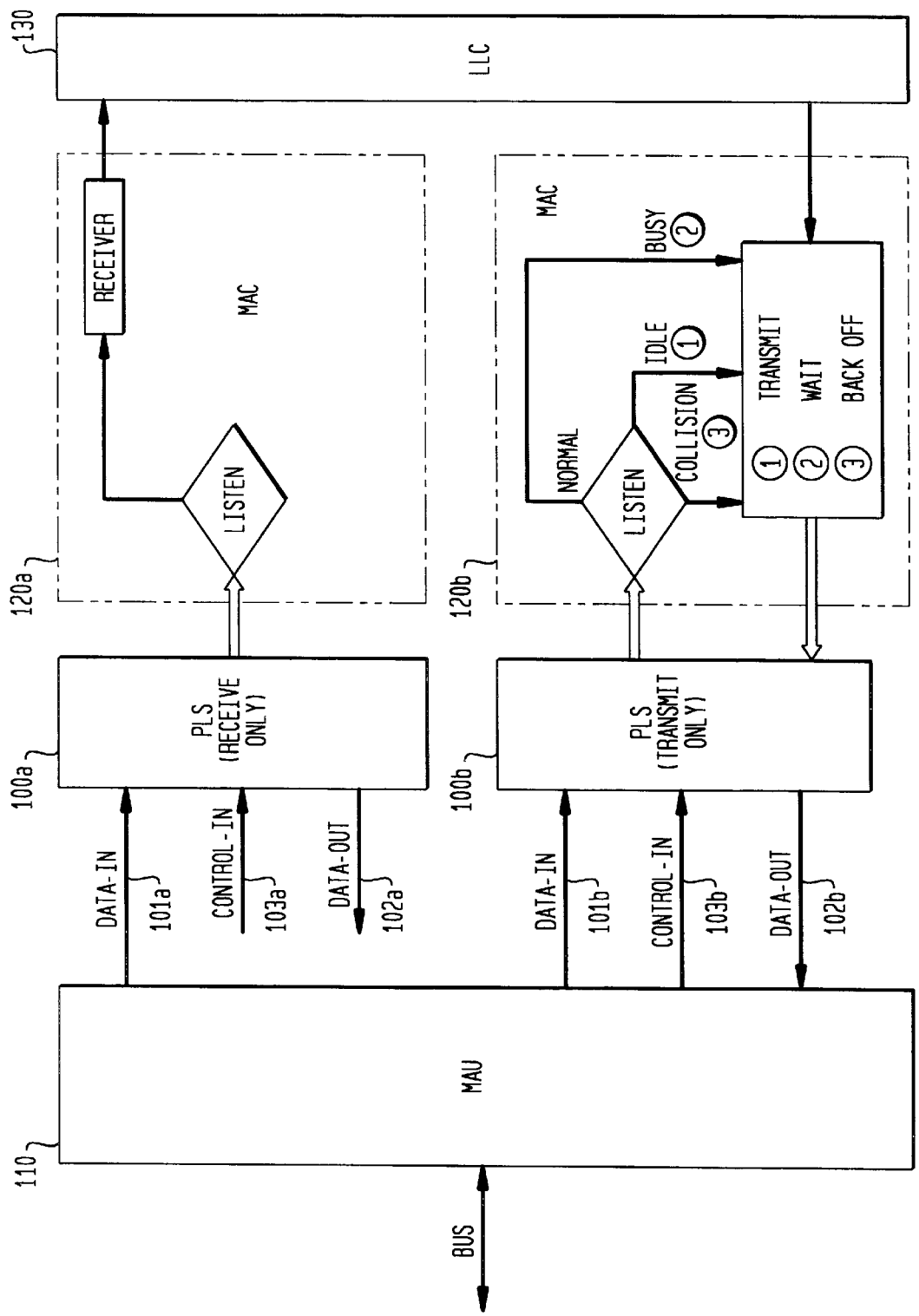
FIG. 9 shows an embodiment of the system used in full-duplex mode.

FIG. 9 illustrates an Ethernet card for the full-duplex scheme. The card is modified to have two independent PLS-MAC chips 100a–120a and 100b–120b. Chips 100a–120a control receiving only and chips 100b–120b control transmitting only. The receiving chip will interface with MAU 110 over Data_In 101a only while the Data_Out and Control_In circuits are unused. Chip 100b will fully utilize all the three interface circuits.

For receiving downstream data, MAU 110 presents the received data to the Data_In circuit of the receiving chip. For upstream transmission, the transmission chip will send the data to the MAU over the Data_Out circuit. MAU 110 also converts the information in the downstream signaling channel(s) to a signal quality message and presents it to Data_In and Control_In of the transmission chip to indicate channel busy and collision. All these functions are independent of data receiving performed by the other chip. Eventually, the two chips could be integrated together.

In either the full-duplex or semi-full-duplex case, a full-duplex bridger or two half-duplex bridgers (one for upstream, one for downstream) will be used at the CO/HE. The standard bridger uses RJ45 ports with a link integrity function. However, because the invention uses the AUI port on the user's Ethernet card, and the network has a separate monitoring scheme, the bridger's link integrity function is useless. Nevertheless, the bridger generates a link pulse and expects a response.

Figure 10:
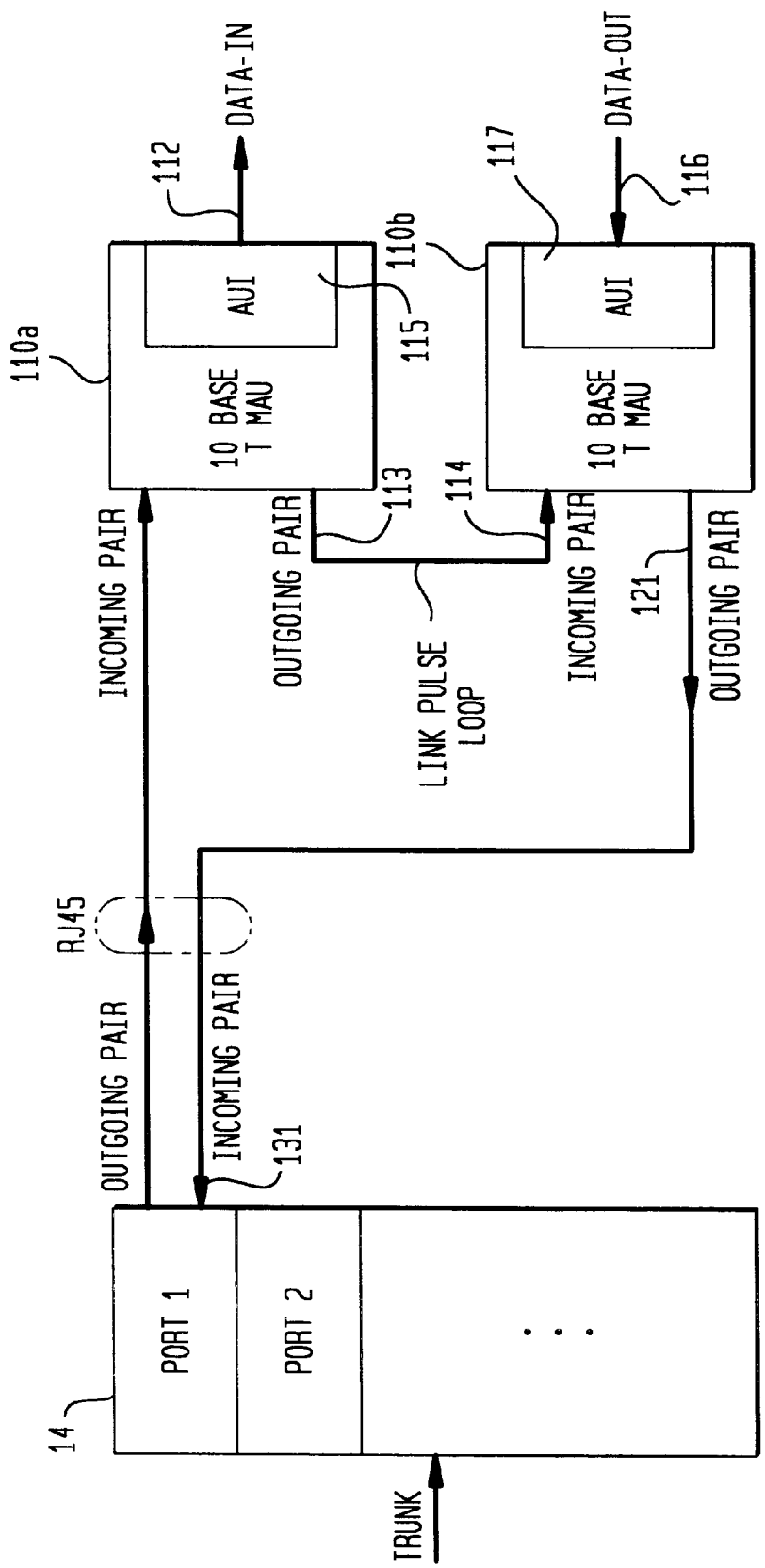
FIG. 10 shows an embodiment of the system using full-duplex mode and a standard bridger.

In order to use a standard bridger without complexity of modification, the invention uses the function of two combined 10BaseT transceivers (MAUs) 110a and 110b as shown in FIG. 10. The first transceiver 110a interfaces with the bridger's transmitting twisted pair 111 and receives the downstream data plus the link pulse. It then passes the data to its Data_In port 112 of its AUI 115, which then interfaces with other RF components for transmitting over the network.

In response to the link pulse, the transceiver 110a then generates another link pulse and presents it to its output pair 113 which is connected to the input pair 114 of another transceiver 110b. The receiving transceiver 110b receives the upstream data from the network over the Data_Out port 116 of it's AUI 117 and generates a link pulse in response to the first transceiver's link pulse. It then passes all of them to its output pair 121 which connects to the bridger's input pair 131. Therefore, a link-pulse loop is created. The bridger 14 and both MAUs 110a and 110b will confirm link integrity, while the MAUs 110a and 110b perform downstream and upstream data transmission independently. In a real hardware implementation, the two MAUs may be integrated together.

Figure 11:
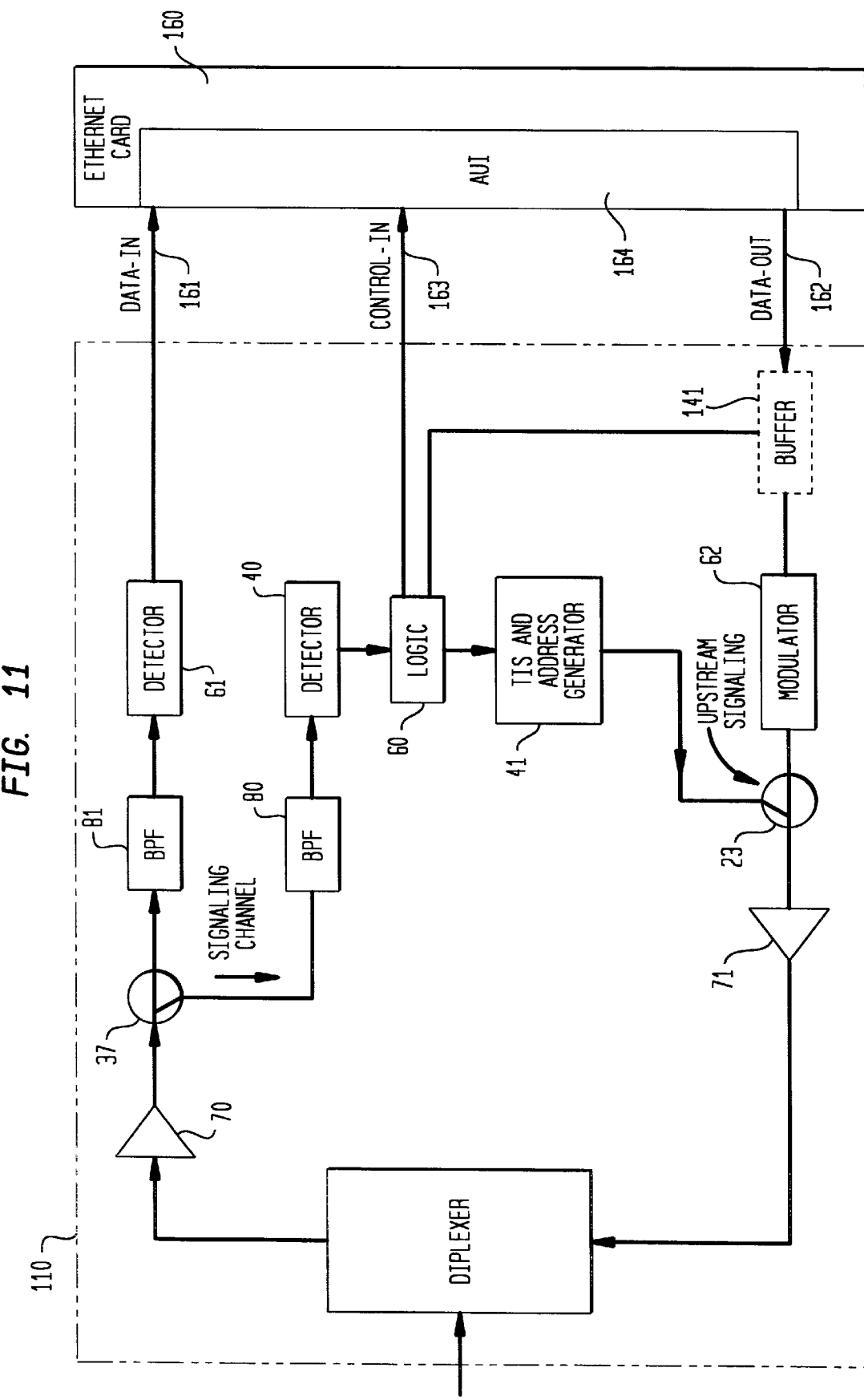
FIG. 11 illustrates a further embodiment of the system.

FIG. 11 shows the standard MAU, modified at the EU site such that it has the same interface to the AUI port of the Ethernet card (Data_In, Data_Out and Control_In) and also interfaces to the network's downstream, upstream, and signaling channels. MAU 110 receives the downstream packets over the downstream data channel(s), converts them to standard 3-level Manchester-coded signals, and passes them to Ethernet card 160 over the Data_In circuit 161. MAU 110 receives outgoing packets from Ethernet card 160 over the Data_Out 162, converts them to the format used over the network, and transmits them upstream. It also performs the network monitoring function using the signaling channel(s) and sends a signal quality message to Ethernet card 160 over the Control_In circuit 163. MAU 110 further includes detectors 40 and 61, logic 60, address and TIS generator 41, modulator 62, band pass filters 80 and 81, and amplifiers 70 and 71. Buffer 141 performs temporary data storage.

In the first embodiment of operating the IN discussed above, MAU 110 compares the packets looped back over the signaling channel(s) with transmitted data and generates a signal-quality message accordingly. With the second embodiment of the IN, MAU 110 converts the TIS to a signal-quality message. In the third IN embodiment, MAU 110 transmits an address over the upstream signaling channel(s) before (using CSMA/CA) or simultaneously to (using CSMA/CD) upstream data transmission, and generates a signal-quality message based on the correctness of the address returned over the downstream signaling channel(s).

In the standard Ethernet implementation, the Ethernet card won't indicate to the MAU 110 that it will transmit data. Therefore, in deploying the CSMA/CA scheme over the network, MAU 110 will send upstream address-signaling upon receiving outgoing data packets from Ethernet card 160 over Data_Out circuit 162, and hold the data packets in a buffer 141 until it receives the address back. MAU 110 will then either release the data packets (no address collision), or indicate a collision to Ethernet card 160. In the out-of-band-signaling CSMA/CA scheme of cases (1)–(4), MAU 110 follows the address-signaling with a TIS or pad (packet stream or RF tone) and transmits over the upstream signaling channel(s). If MAU 110 gets the correct address back, it transmits the data packet upstream from buffer 141 while continuously transmitting the TIS, or stops the TIS or pad as in case (1). It stops sending the TIS upon receiving the end of the packet from Ethernet card 160 over Data_Out circuit 162, as in case (4), or stop TIS ΔT before finishing releasing the data packet as in case (3), while finishing the release of the buffered packet.

Therefore, in case (3) and (4) even though the data transmission is still ongoing over the bus, the end of TIS allows other EUs to test the channel availability without affecting the existing upstream data transmission, as discussed above. Of course, if the PLS/MAC could send a request to the MAU before sending out data, MAU 110 could respond with "not ready" and check the traffic status over the network first, using the address-signaling. Upon receiving the address back, it could then indicate to the PLS/MAC "ready to transmit" or collision. Therefore, no buffer in 110 would be needed. In either case, the Ethernet card proceeds with normal operation based on standard CSMA/CD protocol, while MAU 110 enables CSMA/CA over the network.

When using multiple upstream channels, MAU 110 will determine whether a collision should be indicated and whether another channel should be used. The same situation also applies to priority and reservation schemes. Once again, MAU 110 is used as the interface between Ethernet card 160 and the network. Ethernet card 160 will operate based on the same CSMA/CD protocol built inside the board, while MAU 110 performs additional functions. Of course, the operation algorithm of the Ethernet card could also be modified to cooperate with the MAU's function.

If the signaling and data use the same downstream channel, the MAU will "strip" the signaling out of the packet stream and generate a signal quality message.

Ethernet card 160 uses an AUI port 164 which has two data output pins (Data_Out 162), two data input pins (Data_In 161), and two control input pins (Control_In 163), the same as in the MAU side. Ethernet card AUI 164 also conventionally has two pins for DC power output while the MAU AUI conventionally has two DC power input pins. The regular RJ45 TP has four pairs, and therefore could be used to interconnect MAU 110 and PC (Ethernet card) with one pair for upstream data from PC to MAU, one pair for downstream data from MAU 110 to the PC, one pair for control, and one pair for the PC to power the MAU.

MAU 110 could also interface with multiple PCs at the user's home, and resolves the upstream contention of those PCs at the user premises. This could be done by connecting multiple PCs to MAU 110 using TPs. If MAU 110 detected action over more than one incoming Data circuit, it would send collision signaling to all the PCs or only the transmitting PCs over their Control_In circuits. Certain bridger functions could also be added to the MAU for in-home networking.

The invention could be implemented over a wide variety of networks. The IN could be an existing node in the network with additional functions as discussed above, or an additional node. The IN could also be co-located with the CO/HE. Different transmission media such as fiber, coax, twisted pair or radio link, and different transmission methods such as based band or pass band could all be used between CO/HE and IN, and IN and EUs.

In the mFN-HFC embodiment shown in FIGS. 12(*a*) and 12(*b*), each mFN is installed adjacent to each coax distribution amplifier 170 and serves EUs 20 associated with that amplifier. The mFN then becomes the IN. It passes the upstream data to the CO/HE and broadcasts downstream data from the CO/HE to EUs, independent of services carried by conventional CO-FN-amplifiers-EU paths. Signals from EUs 20 pass through diplexers 21 and 22 to amplifier 70. Coupler 23 diverts a portion of the signal through band pass filter 80 to mixer 35 and local oscillator 36, which work together to up or down convert the signal. The signal is then looped through coupler 37, amplifier 71 and diplexers 22 and 21 back to the EUs. Receiver 30 and transmitter 31 receives signals from and send signals to CO/HE 10.

In the first embodiment of operating the IN, while passing the upstream signals to the CO/HE 10, mFN 110 also taps off parts of the upstream signals, frequency shifts them, and broadcasts them over the downstream signaling channel(s). In the second embodiment, mFN 110 uses the upstream RF signals to trigger a TIS (using TIS generator 41) and sends it over the downstream signaling channel(s). To balance the EUs' upstream signal levels, either the mFN 110 or CO/HE 10 may send a pilot signal downstream as a reference for all the EUs 20 to adjust their upstream transmission signal level. In the third embodiment, mFN 110 receives the upstream address-signaling, frequency shifts it, and sends it over the downstream signaling channel(s).

In the case of multi-channel upstream transmission, multiple signaling channels are used. The mFN then frequency block shifts the upstream signaling and transmits over multiple downstream signaling channels. For the reservation scheme, the mFN buffers the upstream priority/reservation signaling and transmits it downstream based on the algorithm discussed above.

Each mFN may have logically a point-to-point connection back to CO/HE 10. Therefore, the frequencies of the data and signaling channels could be re-used among many mFNs.

Figure 13A:
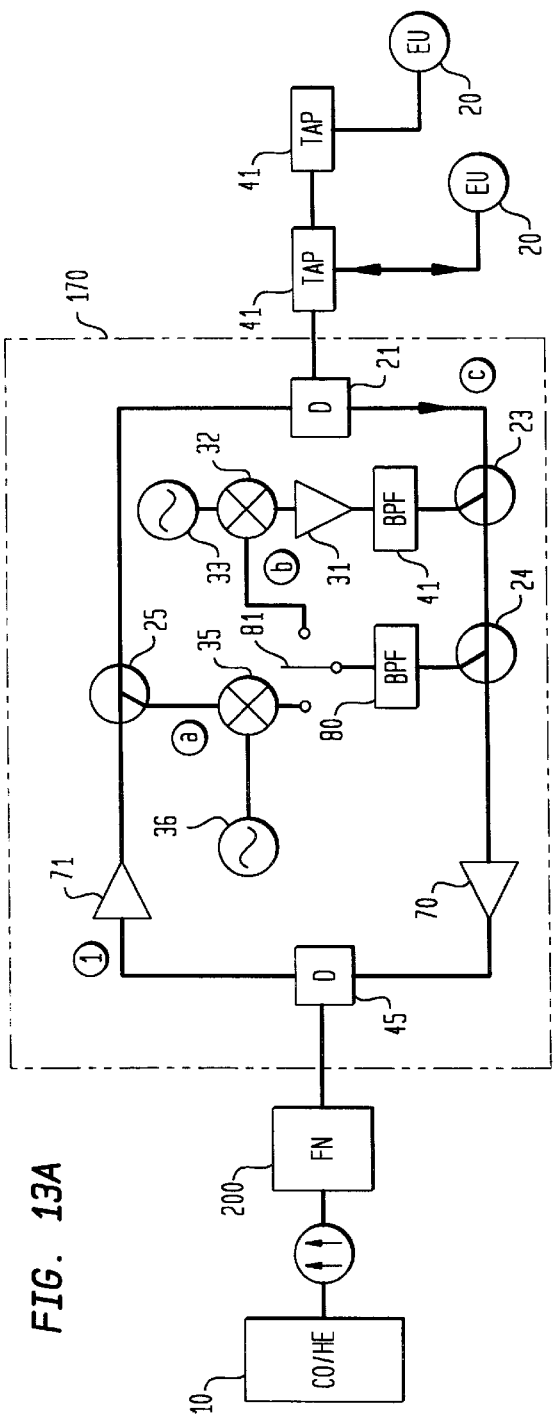
FIG. 13(a) shows an embodiment of the system in an conventional HFC network and FIG. 13(b) illustrates data transmission in relation to frequency.
Figure 13B:
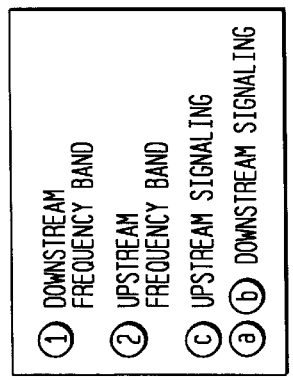
Figure 13B:
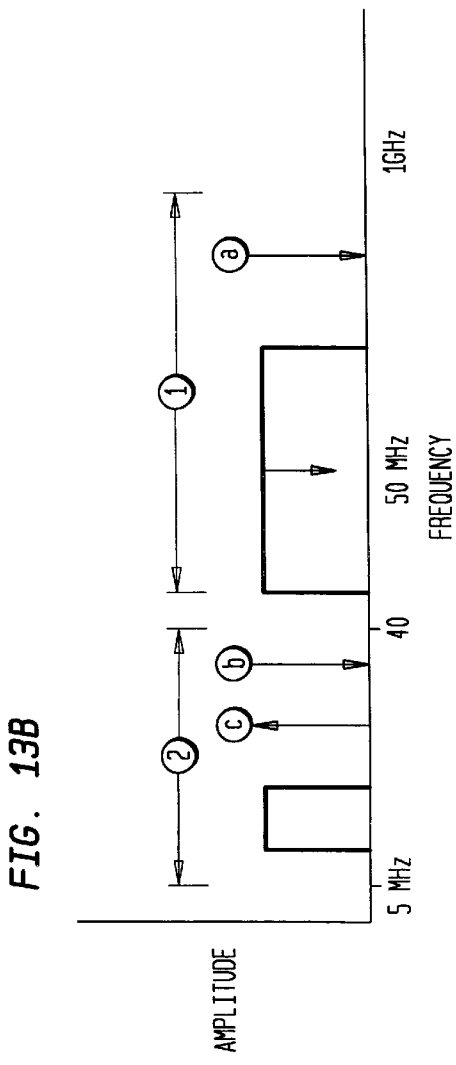

In conventional HFC, the coax distribution amplifiers 170 could become INs with the additional local signaling functions discussed in the mFN-HFC case. As shown in FIG. 13(*a*) and (*b*), the amplifier 170 receives upstream signaling in the traditional 5–40 MHz upstream frequency range, converts it to downstream signaling, and transmits it downstream either in the same 5–40 MHz range or in conventional downstream frequencies ranging from 50 MHz up to 1 GHz.

In FIG. 13(*a*), signals sent by EUs 20 go through diplexer 21 along path ⓒ. Directional coupler 24 taps off part of the signals and sends them to bandpass filter 80 and subsequently to switch 81. At switch 81, the signal could either be passed to mixer 32 or passed to mixer 35. Mixer 32 and local oscillator 33 work together to convert the signals to a frequency band within 5–40 MHZ. Mixer 35 and local oscillator 36 work together to up-convert the signaling to the traditional downstream frequency band (50 MHz–1 GHz). In the first case, the signals traverse path ⓑ and go through amplifier 31, Band Pass Filter (BPF) 41 and coupler 23 and are transmitted downstream in the 5–40 MHz frequency band ⓑ in ②, as shown in FIG. 13(*b*). In the second case, the signals take path ⓐ through coupler 25 and are transmitted downstream in the traditional downstream band ⓐ in ①, as shown in FIG. 13(*b*). The frequency ranges and paths ⓐ–ⓒ are further illustrated in FIG. 13(*b*). Symbols ⓐ and ⓑ represent downstream signaling and ⓒ represents upstream signaling.

Because many amplifiers (INs) typically share the same coax bus, each IN needs to have a dedicated data/signaling RF channel (Frequency Division Multiple Access FDMA) to avoid collision with other INs' transmissions. In other words, in addition to local MAC within the IN's serving areas, a MAC scheme such as FDMA, Time Division Multiple Access (TDMA), or Code Division Multiple Access (CDMA), or separate physical paths, is needed between CO/HE and INs (amplifiers).

In either mFN-HFC or conventional HFC, the FN or even the CO/HE could also be used as an IN, as long as the maximum round trip delay between the IN and furthest EU and the data packet or address packet size can be arranged such that the algorithms discussed above work.

The invention can also be implemented on a wide variety of active star networks such as Active Double Star (ADS), FTTC, etc. The basic architecture is that the CO/HE, Host Digital Terminal (HDT) or basestation has a point-to-point connection to multiple remote nodes (RNs) using fiber, coax cable, TPs or radio links. Each RN further establishes a point-to-point connection to multiple EUs using fiber, coax, TPs, or radio links. The RN then becomes IN. The functions discussed in mFN-HFC could also be used in this case. Also, if dedicated lines are used between each EU and the RN (IN), the function of upstream traffic monitoring is simplified. The IN will broadcast "normal" TIS to all EUs if only one incoming line is active, and broadcast collision TIS when more than one line is active. The IN could also send the collision TIS to only the active lines, allowing other "previously quiet" EUs to start transmission as soon as the colliding EUs stop transmission.

The passive optical network (PON), shown in FIGS. 14(a) and (b), is a star network in which the active RN is replaced by a passive optical splitter or wavelength division multiplexing (WDM) splitter/router. To coordinate the upstream traffic, the upstream light could be detected at the splitter site and converted to a TIS. The TIS could then be broadcast back to the EUs over the downstream fiber (if two fibers are used) or on a separate wavelength or RF subcarrier over the same fiber. Alternatively, to maintain the passive nature of the PON, another approach is to use different wavelengths or different subcarriers for upstream and downstream transmission and passively loop back upstream signals for traffic indication purposes.

FIGS. 14(a) and 14(b) show the layout of the PON. FIG. 14(a) is the case where one splitter 15 is used with one fiber to connect to one EU. FIG. 14(b) is the case where two splitters 15a and 15b are used, one for upstream and one for downstream. Therefore, each EU's upstream and downstream transmission is carried over separate fibers. In either case, if upstream and downstream transmission use different wavelengths, the upstream light is collected over the unused trunk port of the optical splitter 150 or 150b, coupled to the downstream trunk port 151 or the unused trunk port of the other splitter 150a, and broadcast downstream. Therefore, the EU will receive downstream data on one wavelength and the TIS on the other wavelength, which is the same as that of upstream. EU 20 could compare the received TIS, which is the upstream data, with its transmitted data to monitor the traffic condition. With certain upstream transmission level control, the EU could also use the received TIS level to monitor the traffic as discussed before. If only one distribution fiber (and splitter) is used (FIG. 14a), an echo-cancellation scheme may be needed to avoid conflicts between transmitted data and TIS. The same principle also applies to the scenario where upstream and downstream use the same wavelengths but different RF subcarriers.

Figure 15A:
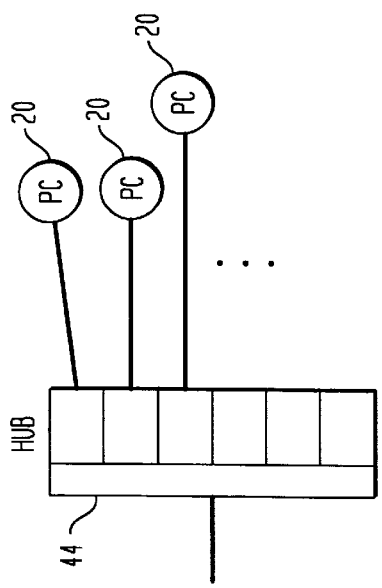
FIG. 15(a) shows a conventional Ethernet 10BaseT architecture and FIG. 15(b) illustrates a modified Ethernet architecture using the invention.
Figure 15B:
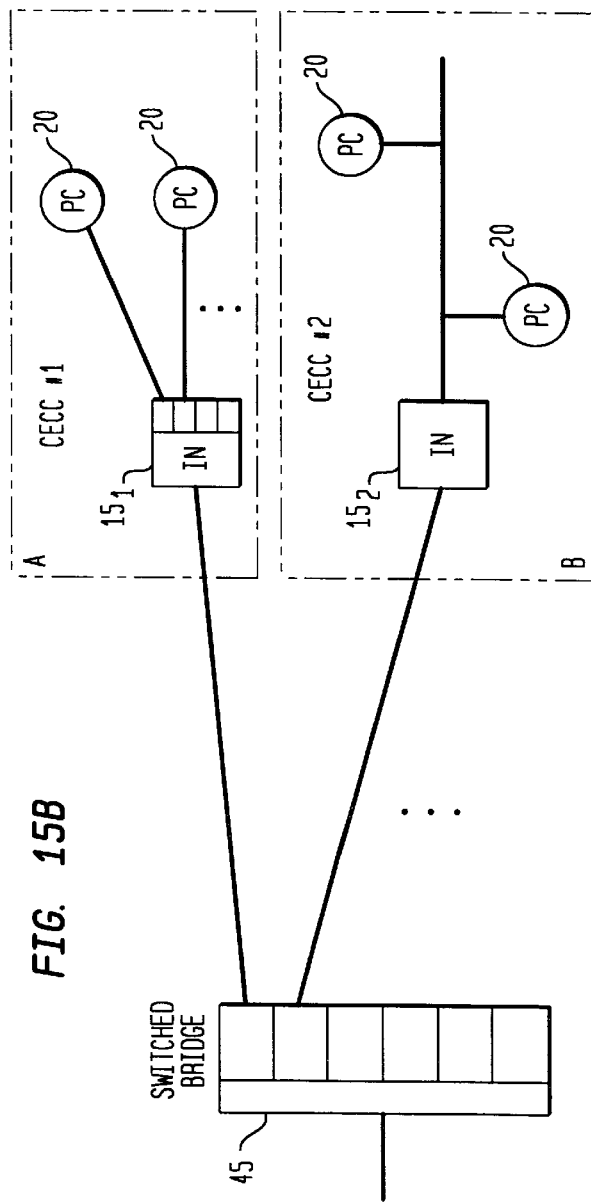

As shown in FIGS. 15(a)–(b) the proposed strategy could also be used to upgrade standard Ethernet to full-duplex operation. The standard Ethernet shown in FIG. 15(a) connects multiple EUs to a hub or bridger 44 using TPs, or connects them over a coaxial bus. Based on the invention, the Ethernet is divided into several small cells A and B as shown in FIG. 15(b). Within each cell, an IN connects to multiple EUs. Each IN then connects to the switched bridger 45. The IN resolves the local contention using the same approaches discussed before with full-duplex transmission (upstream and downstream are on separate pairs or on separate frequencies). Because the contention is resolved locally among small group of EUs, the network efficiency is increased. There are four wire pairs in the standard RJ45 TP bundle, and only three pairs are used (one for upstream, one for downstream, and one for signaling). The other one could be used for multichannel upstream/downstream transmission. All these schemes could also be deployed over coax (10Base5 and 10Base2), fiber, or radio-transmission medium. Also, unlike in conventional Ethernet where each EU connects to one port of the bridger, this approach allows groups of EUs (associated with one IN) to share one port, therefore reducing cost.

It should be noted that the INs could perform the traffic monitoring and indication/control functions independent of two-way communication between the CO and EUs. The INs could also only perform the traffic monitoring and indication/control functions without relaying the bi-directional signal transmission between the CO and EUs. For example, the invention could be implemented over a wireless network. Wired or wireless links connect the INs to multiple fixed or mobile EUs. The INs regulate the upstream traffic from the EUs to the CO or basestation using the algorithms described in previous embodiments. In a wireless network, it may be advantageous for the CO to directly communicate with some or all of the EUs. The INs would handle the traffic monitoring, indication and control (signaling), but may or may not relay the communication signals from the CO to EUs, or from EUs to the CO. The INs could be co-located with one or some of the EUs (e.g. an EU located at a favorable site, perhaps at the top of a hill) and may even share the EUs' antenna.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A method of operating a communication network comprising a central office and at least one intermediate node, the method comprising;
    transmitting downstream signals from the central office to a plurality of end units;
    receiving at the intermediate node upstream signals sent from the plurality of end units;
    transmitting from the intermediate node traffic information signals derived from the received upstream signals to the plurality of end units, the traffic information signals being multi-level RF signals that represent a status of a channel; and
    notifying each end unit of the end units whether any further upstream transmissions can be performed.

2. The method of claim 1, further comprising the step of generating the downstream traffic information signals at the intermediate node.

3. The method of claim 1, wherein the network is a standard Ethernet and wherein the intermediate nodes divide the network into several small cells, each intermediate node resolving contention locally and connecting to a distribution port of a switched bridger.

4. The method of claim 1, further comprising the steps of:
    listening with each end unit to the downstream traffic information signals before transmitting upstream signals;
    transmitting the upstream signals when the downstream traffic information signals indicate that upstream channels are idle or that it is permissible to transmit;
    postponing transmission at each end unit when the traffic information signals indicate that the upstream channels are busy; and
    continuously listening at each end unit to the traffic information signals when transmitting, and comparing the received downstream traffic information signals with the downstream signaling that each end unit expects would be derived from its own transmitted upstream signals, and wherein each end unit stops transmission and backs off when the expected and received signals are different.

5. The method of claim 1, wherein said step of transmitting from the intermediate node comprises the step of looping at least a portion of the upstream signals back to each end unit.

6. The method of claim 1, further comprising the step of generating one of:
   a first signal type indicating that an upstream channel is idle;
   a second signal type indicating that an upstream signal is detected; and
   a third signal type indicating that more than one upstream signal has arrived at the intermediate node simultaneously, thereby indicating a collision.

7. The method of claim 6, wherein each end unit listens to traffic information signals before transmitting upstream signals and does not transmit upstream signals if the second or third signal type is detected.

8. The method of claim 6, wherein each end unit listens while transmitting and stops transmission and backs off if the third signal type is detected.

9. The method of claim 1, further comprising the steps of:
   sending the traffic information signals from the plurality of end units upstream;
   looping at least a portion of the traffic information signals downstream from the intermediate node;
   listening, with the plurality of end units to the downstream traffic information signals; and
   continuously transmitting upstream signals or transmitting upstream signals when the downstream traffic information signals provides a channel idle indication or permission to transmit indication and postponing transmission or backing off when the traffic information signals indicate busy or collision.

10. A method of operating a communication network comprising a central office and at least one intermediate node, the method comprising;
    transmitting downstream signals from the central office to a plurality of end units;
    receiving at the intermediate node upstream signals sent from the plurality of end units;
    transmitting from the intermediate node traffic information signals derived from the received upstream signals to the plurality of end units, the traffic information signals being multi-level RF signals that represent a status of a channel;
    receiving a data packet that represents an address from at least one end unit of the plurality of end units upstream at the intermediate node; and
    transmitting the data packet representing the address downstream with the traffic information signal back to the at least one end unit so that the at least one end unit can determine whether to transmit additional data over the communication network.

11. The method of claim 10, further comprising the steps of:
    comparing, at each end unit, the transmitted address with the received address; and
    transmitting upstream signals with each end unit if the two addresses are the same and halting transmission if the two addresses are different.

12. The method of claim 10, further comprising the steps of:
    sending the address followed by traffic information signaling out-of-band from the upstream signals and prior to sending the upstream signals from each end unit; and
    echoing the address and traffic information signaling downstream from the intermediate node, wherein the end unit transmits upstream signals after receiving the correct address while continuously transmitting the traffic information signaling out-of-band.

13. The method of claim 12, wherein the end unit stops sending the traffic information signaling at a time $\Delta T$ before finishing sending upstream signals, wherein the time $\Delta T$ is equal to or smaller than the time duration of sending the address packet.

14. The method of claim 12, wherein the end unit stops sending the traffic information signaling before finishing sending upstream signals such that the duration of the address and signaling is substantially the same as the duration of the upstream signals.

15. The method of claim 12, wherein the end unit stops sending the upstream signals and traffic information signaling simultaneously.

16. The method of claim 12, further comprising the steps of:
    beginning transmission of upstream signals from the end unit and simultaneously halting transmission of traffic information signaling from the end unit; and
    continuously transmitting traffic information signals from the intermediate node, the traffic information signals derived from the upstream signals.

17. The method of claim 10, further comprising the step of simultaneously sending the address from an end unit with its upstream signal.

18. The method of claim 10, comprising sending the address in-band with the upstream signals.

19. The method of claim 1, wherein the central office sends the downstream signals over a first communication path and the intermediate node sends the traffic information signals over a second communication path.

20. The method of claim 1, comprising sending the downstream signals from the central office and the traffic information signals from the intermediate node over a common communication path but on different RF channels.

21. The method of claim 1, comprising sending the downstream signals from the central office and traffic information signals from the intermediate node over a common communication path using one of different optical wavelengths and different codes.

22. The method of claim 1, further comprising the step of sending the downstream signals, traffic information signals, and upstream signals over at least one of optical fibers, coaxial cables, twisted pairs, and radio links.

23. The method of claim 1, wherein the downstream and upstream signals and the traffic information signals comprise at least one of coded baseband signals, uncoded baseband signals, and RF signals.

24. The method of claim 1, wherein the duration of the traffic information signals is larger than the maximum round trip delay between the intermediate node and a selected end unit.

25. The method of claim 1, comprising sending the downstream signals from the central office and the traffic information signals from the intermediate node over a common RF channel and transmitting the downstream signals with a interpacket space having a size such that the intermediate node can insert traffic information signals in the interpacket space.

26. The method of claim 1, wherein the central office sends downstream signals in certain time periods and the end units transmit upstream signals and the intermediate nodes insert traffic information signals in other time periods.

27. The method of claim 1, comprising transmitting the upstream signals over multiple channels, such that each end unit can dynamically choose a channel based on received traffic information signals.

28. The method of claim 1, further comprising the steps of:

sending priority signaling upstream from at least one selected end unit; and looping the priority signaling downstream at the intermediate node to allow the selected end unit to have high priority for occupying a channel such that other end units have low priority to transmit on that channel.

29. The method of claim 1, further comprising the step of:

sending reservation signaling upstream from at least one selected end unit to allow the selected end unit to reserve time slots such that other end units cannot transmit during the time slots on a particular channel.

30. The method of claim 1, further comprising the step of using a standard Ethernet card in the end unit and transmitting Manchester coded signals directly over the network.

31. The method of claim 1, further comprising the step of using a standard Ethernet card and DC shifting the Manchester coded signals with a standard Ethernet transceiver to become two-level signals carried directly by an RF carrier over the network and detecting the RF signal and converting it back to three-level Manchester code.

32. The method of claim 1, further comprising the step of using an Ethernet card as an end unit by disabling a loop back function in order to allow independent upstream and downstream operation.

33. The method of claim 1, further comprising the steps of:

connecting a transceiver with the AUI port of an Ethernet card at an end unit;

interfacing a downstream channel from the transceiver to the Ethernet card using a Data_In circuit;

interfacing an upstream channel from the Ethernet card to the transceiver using a Data_Out circuit; and interfacing a traffic information signaling channel from the Ethernet card to the transceiver using a Control_In circuit.

34. The method of claim 32, further comprising the step of transmitting the upstream signal from the end unit about 9.6 $\mu$s after an incoming packet ends independent of receiving functions.

35. The method of claim 1, comprising separating transmitting and receiving functions of an Ethernet card such that each end unit can transmit when the upstream channel is free.

36. The method of claim 35, further comprising the steps of:

connecting a transceiver with a first Ethernet chip;

interfacing a downstream channel to the end unit using a Data_In circuit of the first Ethernet chip; and interfacing an upstream channel and traffic information signal channel from the end unit using a Data_Out and Control_In circuit, respectively, of a second Ethernet chip to enable independent two-way operation such that each end unit can transmit any time the upstream channel is free.

37. The method of claim 1, wherein a standard Ethernet switched bridger is used at the central office, and wherein each distribution port of the bridger is connected to each intermediate node and will be shared by multiple end units served by the intermediate node.

38. The method of claim 1, comprising using a standard Ethernet bridger at the central office and two 10BaseT transceivers also located at the central office such that an output pair from the bridger connects to a first transceiver's input pair and an output pair of the first transceiver connects to a second transceiver input pair, wherein an output pair of the second transceiver connects to an input pair of the bridger to create a link-pulse loop to satisfy a link-integrity request of the bridger and the first and the second transceivers.

39. The method of claim 1, wherein the intermediate node and the central office are at the same location.

40. The method of claim 1, comprising transmitting over a mFN-HFC network, wherein the intermediate node is a mini-fiber node.

41. The method of claim 1, wherein the network is a conventional HFC network and the intermediate node is a coax amplifier that transmits the traffic information signaling downstream in one of a 5–40 MHz range and a conventional downstream frequency band of 50 MHz to 1 GHz.

42. The method of claim 1, wherein the network is conventional HFC or mFN-HFC, and the intermediate node is the fiber node.

43. The method of claim 1, wherein the network is an active star network and the intermediate node is a remote node such that the intermediate node sends a channel-busy traffic information signal to all users when one upstream line is active, and sends a collision traffic information signal to at least one user if more than one upstream line is active.

44. The method of claim 1, wherein the network is a passive optical network and the intermediate node is at least one of at least one optical splitter and at least one WDM splitter/router, and wherein the upstream and downstream signals use different wavelengths or RF carriers such that upstream light is collected at an unused trunk port of one of the at least one splitter and is routed downstream over one of the same fiber and a different fiber.

45. A method of operating a communication network that includes a central office at least one intermediate node, the method comprising:

transmitting downstream signals from the central office to a plurality of end units; receiving, at the intermediate node, upstream signals sent from the plurality of end units;

transmitting, from the intermediate node, traffic information signals derived from received upstream signals to the plurality of end units, the traffic signals being multi-level RF signals that represent a status of a channel;

listening to, with each of the end units, the downstream traffic information signals before transmitting the upstream signals;

transmitting the upstream signals when the downstream traffic information signals indicate that upstream channels are idle, or that it is permissible to transmit;

postponing transmission at each of the end units when the downstream traffic information signals indicate that the upstream channels are busy; and continously listening at each of the end units to the downstream traffic information signals when transmitting, and comparing the received downstream traffic information signals with downstream signaling that each of the end units expects would be derived from its own transmitted upstream signals, and wherein each of the end units stops transmission and backs off when expected and received signals are different.

46. A communication network for communicating with a plurality of end units, the communication network comprising:

a central office for transmitting downstream signals to the plurality of end units and for receiving upstream signals sent by the plurality of end units;

at least one intermediate node positioned in the network, the intermediate node comprising, a traffic information signal transmission device that uses a portion of the upstream signals and transmits to the plurality of end units traffic information signals derived from the portion of the upstream signals received from the plurality of end units, wherein the traffic information signals comprise multi-level RF signals that represent a status of a channel for notifying each end unit of the end units whether any further upstream transmissions can be performed.

47. The network of claim 46, wherein the at least one intermediate node further comprises a traffic information signal generating device that generates the traffic information signals.

48. The network of claim 46, wherein the network is a standard Ethernet and wherein the intermediate nodes divide the network into several small cells such that each intermediate node resolves contention locally and connects to a distribution port of a switched bridger.

49. The network of claim 46, wherein each end unit listens to the downstream traffic information signals before transmitting upstream signals and transmits the upstream signals when the downstream traffic information signals indicate that the upstream channels are idle or that transmission is permissible, and waits when the traffic information signals indicate the upstream channels are busy, and wherein each end unit compares the received downstream traffic information signals with the downstream signaling that it expects would be derived from its own transmitted upstream signals, and wherein the end unit stops transmission and backs off when the expected and received signals are different.

50. The network of claim 46, wherein the intermediate node transmits the traffic information signals by looping at least a portion of the upstream signals back to each end unit.

51. The network of claim 46, wherein each intermediate node, upon receiving upstream signals, generates and transmits traffic information signals comprising one of:
 a first signal type indicating that an upstream channel is idle;
 a second signal type indicating that an upstream signal is detected; and
 a third signal type indicating that more than one upstream signal has arrived at the intermediate node simultaneously, thereby indicating a collision.

52. The network of claim 51, wherein each end unit listens to traffic information signals before transmitting upstream signals and does not transmit upstream signals if the second or third signal type is detected.

53. The network of claim 51, wherein each at least one end unit listens while transmitting and stops transmission and backs off if the third signal type is detected.

54. The network of claim 46, further comprising:
 a transmission device within each end unit that sends traffic information signals upstream;
 looping means within the intermediate node for looping at least a portion of the traffic information signals downstream;
 receiving apparatus within each end unit that listens to downstream traffic information signals; and
 transmitting apparatus within each end unit that continuously transmits upstream signals or transmits upstream signals when the downstream traffic information signals provide a channel idle indication or permission to transmit indication and postpones transmission or backs off when the traffic information signals indicate busy or collision.

55. The network of claim 46, wherein an address of the at least one end unit is sent upstream to the intermediate node and the address is transmitted downstream back to the end unit.

56. The network of claim 55, wherein the end unit makes a comparison between the transmitted address and the received address and transmits upstream signals if the two addresses are the same and halts transmission if the two addresses are different.

57. The network of claim 55, wherein the upstream signals are transmitted simultaneously with the address of the end unit and other information sent by the end unit.

58. The network of claim 46, wherein the central office further comprises an Ethernet switched bridger having each distribution port connected with an intermediate node and shared by multiple end units served by the intermediate node.

59. The network of claim 46, further comprising a transceiver that connects with an AUI port on a standard Ethernet card at an end unit and interfaces using a downstream channel with a Data_In circuit and an upstream channel with a Data_Out circuit and a traffic information signaling channel using a Control_In circuit.

60. The network of claim 46, wherein a transceiver interfaces with a downstream channel using a Data_In circuit of a first Ethernet chip and the transceiver further interfaces with an upstream channel and traffic information signal channel using a Data_Out circuit and Control_In circuit, respectively, of a second Ethernet chip to enable independent two-way operation such that each end unit of the end units can transmit when the upstream channel is free.

61. The network of claim 46, comprising using a standard Ethernet bridger at the central office and two 10BaseT transceivers also located at the central office such that an output pair from the bridger connects to a first transceiver's input pair and an output pair of the first transceiver connects to a second transceiver input pair, wherein an output pair of the second transceiver connects to the bridger's input pair to create a link-pulse loop to satisfy link integrity requests of the bridger and the first and the second transceivers.

62. The network of claim 46, wherein the intermediate node and the central office are at the same location.

63. The network of claim 46, wherein the network is a mFN-HFC network, and the intermediate node is a mini-fiber node.

64. The communication network of claim 46, wherein the network is a conventional HFC network and the intermediate node is a coax amplifier that transmits traffic information signaling downstream in one of 5–40 MHz and conventional downstream frequency band of 50 MHz to 1 GHz.

65. The network of claim 46, wherein the network is one of conventional HFC and mFN-HFC, and the intermediate node is the fiber node.

66. The network of claim 46, wherein the network is an active star network and the intermediate node is a remote node that sends a channel-busy traffic information signal to all the users when one upstream line is active and sends a collision traffic information signal to at least one user if more than one upstream line is active.

67. The network of claim 46, wherein the network is a passive optical network and the intermediate node is at least one of at least one optical splitter and at least one WDM splitter/router, and wherein the upstream and downstream use different wavelengths or RF carriers such that the upstream light is collected at the at least one splitter's unused trunk port and routed downstream over one of the same and a different fiber.

* * * * *